(12) United States Patent
Marchetto

(10) Patent No.: US 12,190,319 B2
(45) Date of Patent: Jan. 7, 2025

(54) METHOD AND SYSTEM WITH ARTIFICIAL INTELLIGENCE FOR PROVIDING PURCHASE PROPOSALS AND PERSONALIZED AND/OR AUTOMATED PAYMENT SERVICES

(71) Applicant: Cornèr Banca SA, Lugano (CH)

(72) Inventor: Jarno Marchetto, Canobbio (CH)

(73) Assignee: Cornèr Banca SA, Lugano (CH)

( * ) Notice: Subject to any disclaimer, the term of this patent is extended or adjusted under 35 U.S.C. 154(b) by 0 days.

(21) Appl. No.: 18/181,814

(22) Filed: Mar. 10, 2023

(65) Prior Publication Data

US 2023/0289799 A1    Sep. 14, 2023

(30) Foreign Application Priority Data

Mar. 11, 2022  (CH) ...................................... 258/2022
Mar. 11, 2022  (IT) ......................... 102022000004757

(51) Int. Cl.
*G06Q 20/40*          (2012.01)

(52) U.S. Cl.
CPC .................................. *G06Q 20/401* (2013.01)

(58) Field of Classification Search
CPC .................................................... G06Q 20/401
USPC ..................................................... 705/35–45
See application file for complete search history.

(56) References Cited

U.S. PATENT DOCUMENTS

| | | | |
|---|---|---|---|
| 2018/0276710 A1* | 9/2018 | Tietzen .............. | G06Q 30/0269 |
| 2020/0327604 A1* | 10/2020 | Morin ................ | G06Q 30/0631 |
| 2021/0056385 A1* | 2/2021 | Mane ...................... | G06N 3/045 |
| 2022/0020049 A1* | 1/2022 | Rao ......................... | G06N 20/00 |

FOREIGN PATENT DOCUMENTS

CN          113763119          12/2021

OTHER PUBLICATIONS

Search Report and Written Opinion in Italian Appln. No. IT 202200004757, dated Oct. 21, 2022, 19 pages (with English Translation).
Search Report in European Appln. No. EP 23160964.5, dated May 30, 2023, 10 pages.

* cited by examiner

*Primary Examiner* — Robert R Niquette
(74) *Attorney, Agent, or Firm* — Fish & Richardson P.C.

(57) ABSTRACT

A method for providing purchase proposals and personalized and/or automated payment services to a subject includes
  electronic accessing a personalized payment services provisioning system and
  retrieval of at least a first type of electronic data of said subject including payment data and/or deadlines and a data group identifying one or more characteristics of the subject.

At least part of the first type of electronic data is stored.

Electronic processing is performed, including electronic profiling of the subject. A group of personalized service proposals is generated for the subject and/or of proposals of personalized electronic payment requests, and at least one of the following proposal actions is generated:
  an electronic proposition of said services personalized for the subject, for the purchase of at least a product and/or service,
  a proposition of said personalized electronic payment request of a predetermined amount associated to the purchase of a product and/or service.

28 Claims, 6 Drawing Sheets

101: Identification module of patterns and/or segments

102: Profiling module of preferences of the user

METHOD AND SYSTEM WITH ARTIFICIAL INTELLIGENCE FOR PROVIDING PURCHASE PROPOSALS AND PERSONALIZED AND/OR AUTOMATED PAYMENT SERVICES

CLAIM OF PRIORITY

This claims priority under 35 U.S.C. § 119 to Swiss Application Serial No. CH000258/2022, filed Mar. 11, 2022, and Italian Application Serial No. 102022000004757, filed Mar. 11, 2022, the entire contents of which are hereby incorporated by reference.

FIELD OF THE INVENTION

The present invention refers to the field of computer-implemented methods and in detail concerns a method with artificial intelligence for providing purchase proposals and personalized and/or automated payments services. The present invention refers also to a system with artificial intelligence, configured for providing purchase proposals and personalized and/or automated payment services.

BACKGROUND ART

The development of commercial services supply via Internet has made possible a considerable personalization of the commercial proposal towards users, who now have access to resources once unimaginable.

During the last years, and parallel to the diffusion of commercial services via Internet, have become increasingly popular payments by bank card, in particular credit card, prepaid card or debit card for a large plurality of services comprising, but non-exclusive thereto, internet orders, hotel and flight reservations, cabs, fuel and/or shipping services payments and health and/or rescue payments. These services often refer to subscriptions or otherwise are services that are repeated cyclically over time.

However, over the past few years, especially for determined market segments, an increase in activities of management and parallel to the use of credit cards has been observed. In particular, the Applicant has observed that there are increasing requirements to control subscriptions and user billings. Such controls often take time, and any invoicing problems, e.g., incorrect amounts, overbilling, or frauds, are discovered late, in particular if the user is not particularly attentive. In some cases, in fact, the Applicant has found that the user often ignores to double-check small billing items and/or is stressed by the control burden imposed by the use of the credit card.

Furthermore, the Applicant has observed that for determined market segments there is often a need to have quick reservations of products or services, including and non-exclusively catering services.

Objects

The object of the present disclosure is to describe a method, a distributed computing environment and a system that allows to reduce the workload collateral to the use of bank card, or equivalent means of payment, for the subject itself.

The object of the present disclosure is in particular to describe a method, a distributed computing environment and a system that allows to optimize the effectiveness of payments made by bank cards, in particular credit, prepaid or debit cards.

The object of the present disclosure is in particular to provide a method, a distributed computing environment and a system that allows to automatize some payment processes and/or to predict, on the basis of predefined patterns, determined behaviours or onset of payment to the user.

The object of the present disclosure is also to provide a method, a distributed computing environment and a system that quickly allows to detect if, in a plurality of payments to carry out, there are payments that exceed a predetermined threshold and/or are sensibly different with respect to a payment history for the same service, and that optionally allows the user to implement determined transactions so that any undue charges can be contained.

It is also object of the present disclosure to describe a method, a distributed computing environment and a system that allows the subject itself to interact with a remote human or virtual butler, so that the latter can advise him on possible alternatives or possibilities in relation to a determined need of the subject itself, and that subsequently, possibly without intervention by the subject, can automatically manage payments associated with the need expressed by the subject.

It is also object of the present disclosure to describe a method, a distributed computing environment and a system that is capable of learning the habits of the subject itself and/or tracking any changes of said habits, so as to optimize the personalization of the services offered.

SUMMARY

These and other purposes are obtained by means of a method for providing personalized payment services to a subject, according to the following aspects. These aspects may be combined among them or with claims and/or with details of the following detailed description.

Method

According to a first aspect it is herein described a method for providing purchase proposals and personalized and/or automated payment services to a subject, the method comprising:

a step of electronic access (1000) to a personalized payment services provisioning system (1), the step of electronic access being carried out by means of an electronic device (2) operatively associated to the subject;

a step of retrieval (1001) of at least a first type of electronic data (20) of said subject comprising payment data and/or deadlines, said step of retrieval being carried out by said system (1) after said electronic access and comprising a reception of at least part of said first type of electronic data (20) from said electronic device (2) or from a third system (3);

a step of storage (1002) of at least part of said first type of electronic data (20) within said system (1);

a step of data electronic processing (1003), carried out after the step of retrieval (1001) of the at least a first type of electronic data (20), wherein a data processing engine (100) processes at least part of the first type of electronic data (20) stored within said system (1), said method comprising the at least partially automated generation, and by means of the data processing engine (100), of at least one of the following proposal actions (1004; 1005):

an electronic proposition (1004) of services personalized for the subject (105), for the purchase of at least a product and/or service, said electronic proposition (1004) occurring through an electronic transmission towards the electronic device (2) operatively associated to the subject (105);

a proposition of a personalized electronic payment request (1005) of a predetermined amount associated to the purchase of a product and/or service, wherein the amount is determined basing on said first type of electronic data (20) and/or basing on the processing carried out by the data processing engine (100); said proposal actions (1004; 1005) being based at least on at least part of said first type of electronic data (20) stored in the system (1) and/or on at least a preceding proposal action (1004; 1005) previously electronically processed through said data processing engine (100).

According to another aspect, it is herein described a method for providing purchase proposals and personalized and/or automated payment services to a subject, the method comprising:

a step of electronic access (1000) to a personalized payment services provisioning system (1), the step of electronic access being carried out by means of an electronic device (2) operatively associated to the subject;

a step of retrieval (1001) of at least a first type of electronic data (20) of said subject comprising payment data and/or deadlines, said step of retrieval being carried out by said system (1) after said electronic access and comprising a reception of at least part of said first type of electronic data (20) from said electronic device (2) or from a third system (3);

a step of storage (1002) of at least part of said first type of electronic data (20) within said system (1);

a step of data electronic processing (1003), carried out after the step of retrieval (1001) of the at least a first type of electronic data (20), wherein a data processing engine (100) processes at least part of the first type of electronic data (20) stored within said system (1), said method comprising the at least partially automated generation, and by means of the data processing engine (100), of the following proposal actions (1004; 1005):

an electronic proposition (1004) of services personalized for the subject (105), for the purchase of at least a product and/or service, said electronic proposition (1004) occurring through an electronic transmission towards the electronic device (2) operatively associated to the subject (105);

a proposition of a personalized electronic payment request (1005) of a predetermined amount associated to the purchase of a product and/or service, wherein the amount is determined basing on said first type of electronic data (20) and/or basing on the processing carried out by the data processing engine (100);

the proposition of an electronic payment request (1005) comprising the activation of an electronic payment module (110) configured for allowing the execution of an electronic payment for the purchase of said product and/or service and comprising the execution of the electronic payment by means of the electronic payment module (110), said proposal actions (1004; 1005) being based at least on at least part of said first type of electronic data (20) stored in the system (1) and/or on at least a preceding proposal action (1004; 1005) previously electronically processed through said data processing engine (100).

According to another aspect, it is herein described a method for providing purchase proposals and personalized and/or automated payment services to a subject, the method comprising:

a step of electronic access (1000) to a personalized payment services provisioning system (1), the step of electronic access being carried out by means of an electronic device (2) operatively associated to the subject;

a step of retrieval (1001) of at least a first type of electronic data (20) of said subject comprising payment data and/or deadlines, said step of retrieval being carried out by said system (1) after said electronic access and comprising a reception of at least part of said first type of electronic data (20) from said electronic device (2) or from a third system (3);

a step of storage (1002) of at least part of said first type of electronic data (20) within said system (1);

a step of data electronic processing (1003), carried out after the step of retrieval (1001) of the at least a first type of electronic data (20), wherein a data processing engine (100) processes at least part of the first type of electronic data (20) stored within said system (1), said method comprising the at least partially automated generation, and by means of the data processing engine (100), at least of the following proposal action (1005):

a proposition of a personalized electronic payment request (1005) of a predetermined amount associated to the purchase of a product and/or service, wherein the amount is determined basing on said first type of electronic data (20) and/or basing on the processing carried out by the data processing engine (100);

wherein the proposition of an electronic payment request (1005) comprising the activation of an electronic payment module (110) configured for allowing the execution of an electronic payment for the purchase of said product and/or service and comprising the execution of the electronic payment by means of the electronic payment module (110), said proposal action (1005) being based at least on at least part of said first type of electronic data (20) stored in the system (1) and/or on at least a preceding proposal action (1005) previously electronically processed through said data processing engine (100).

According to another non-limiting aspect, the method comprises also the execution of the following proposal action:

an electronic proposition (1004) of services personalized for the subject (105), for the purchase of at least a product and/or service, said electronic proposition (1004) occurring through an electronic transmission towards the electronic device (2) operatively associated to the subject (105).

According to another non-limiting aspect, the step of data electronic processing (1003) comprises an analysis and/or processing of the typology and/or of the segmentation of electronic payments carried out by the subject (105) through the system (1), and/or comprises an analysis and/or processing of data of specific preference of the subject (105), optionally directly received by the subject (105) and/or electronically extrapolated from previous electronic payments carried out by the subject (105) through the system (1), and/or comprises an analysis and/or processing of data deriving from sources (108*a*, 108*b*) external to the system (1), and/or comprises an analysis and/or processing of request electronic data that the subject (105) sends to an interactive and/or interpretative dialogue interface (106) of the system (1).

According to another non-limiting aspect, the proposition of an electronic payment request (1005) comprises the activation of an electronic payment module (110) configured for allowing the execution of an electronic payment for the purchase of said product and/or service, optionally instead of the subject (105), wherein said electronic payment is generated by said proposition of a personalized electronic payment request (1005).

According to another non-limiting aspect, the activation of the electronic payment module (110) causes an electronic access to, and/or an exchange of electronic data with, an electronic payment entity (5), optionally a bank institute and/or a bank card, optionally credit cards, management institute and/or a financial institute to which the subject (105) has been previously electronically affiliated.

According to another non-limiting aspect, the proposition of the electronic payment request (1005), and/or the electronic payment, concerns a product and/or service proposed through said electronic proposition (1004).

According to another non-limiting aspect, the activation of the electronic payment module (110) causes the activation of a products and/or services distribution module (109).

According to another non-limiting aspect, the activation of the electronic payment module (110) causes an electronic arrangement of an invoicing of amounts corresponding to the electronic payment, and/or causes a control of a distribution and/or a control of a delivery of products and/or services purchased by the subject (105), and/or causes the start of a step of digital type product and/or service transmission management towards a predefined electronic device, optionally wherein said predefined electronic device is the electronic device of the subject (105) and/or is an electronic device operatively associated to the subject (105), and/or causes the start of a step of distribution addresses management towards which distributing a product and/or service purchased through said electronic payment, and/or causes the electronic alerting of a distributing partner for the distribution of a physical product towards a predetermined address, said physical product having been purchased through the electronic payment.

According to another non-limiting aspect, the segmentation of electronic payments previously carried out comprises a classification of electronic payments at least according to a predefined merchant category and/or a Merchant Category Code (MCC), and/or the method comprises a step of electronic segmentation of electronic payments carried out through the system (1) according to at least a predefined merchant category and/or a Merchant Category Code (MCC), and/or the method comprises an assignment of a predefined merchant category and/or of a Merchant Category Code (MCC), to each electronic payment.

According to another non-limiting aspect, said expense average typology is associated to said merchant category and/or to said Merchant Category Code (MCC).

According to another non-limiting aspect, the method comprises a step of electronic extrapolation of a particular typology of products and/or services previously purchased by means of an electronic payment, optionally wherein the step of electronic extrapolation comprises an analysis of the merchant category, and/or of the Merchant Category Code (MCC), and/or of the vendor name associated to said electronic payment, for obtaining additional electronic information inherent to details of the typology of products or services.

According to another non-limiting aspect, the expense average typology comprises said typology of products or services.

According to another non-limiting aspect, the method comprises:
the execution, optionally through an identification module of patterns and/or segments (101), of a categorization of the expense average typology on more levels nested among them, said levels comprising each one a plurality of options.

According to another non-limiting aspect, the assignment of a predefined electronic payment to one of said levels and/or options is based on the analysis of the merchant category and/or of the Merchant Category Code (MCC) and/or on further electronic extrapolations carried out starting from said merchant category and/or from said Merchant Category Code (MCC).

According to another non-limiting aspect, the method comprises a step of electronic modelling of a behaviour of the subject, by means of the data processing engine (100), finalized to define an electronic model of behaviour for said subject, said electronic model being optionally electronically adaptive.

According to another non-limiting aspect, the electronic model is based on at least part of the data (20) retrieved in the step of retrieval (1001) and/or basing on one or more actions of electronic confirmation of the electronic proposition (1004) of personalized purchase services for the subject and/or of the proposition of an electronic payment request (1005).

According to another non-limiting aspect, said electronic confirmation is executed by the subject through its own electronic device (2).

According to another non-limiting aspect, said confirmation actions comprise a step of transmission of at least a confirmation electronic data from said electronic device (2) towards said system (1).

According to another non-limiting aspect, the method comprises a step of electronic definition of a plurality of segments (101e) of behaviour of subjects, wherein said segments (101e) define and/or categorize levels of electronic payment and/or type of products or services purchased through an electronic payment.

According to another non-limiting aspect, the method comprises a step of assignment of at least a segment of said plurality of segments (101e) to the electronic model of behaviour of said subject and/or a step of logical association between the electronic model of behaviour of said subject with a specific segment of the plurality of segments (101e).

According to another non-limiting aspect, the method comprises a step of electronic definition of a plurality of patterns associated to products and/or services purchased through electronic payment, said patterns defining geographic locations associated with products and/or services purchased through said electronic payment.

According to another non-limiting aspect, the method comprises a step of assignment of at least a pattern of said plurality of patterns to the electronic model of behaviour of said subject and/or a step of logical association between the electronic model of behaviour of said subject with a specific pattern of the plurality of patterns.

According to another non-limiting aspect, the step of electronic definition of a plurality of segments (101e) and/or the step of assignment of at least a segment of said plurality of segments (101e), and/or the step of electronic definition of a plurality of patterns associated to products and/or services purchased through electronic payment and/or a step of assignment of at least a pattern of said plurality of patterns is carried out electronically by a profiling module (101, 102) of said data processing engine (100), said profiling module comprising a, or being operatively connected to, an artificial intelligence and/or machine learning engine.

According to another non-limiting aspect, said artificial intelligence and/or machine learning engine is configured for defining and/or attributing patterns and/or segments.

According to another non-limiting aspect, the method comprises a step of profiling of preferences of the user comprising an electronic analysis and/or processing, optionally carried out by a profiling module of the preferences of the user (102), of electronic data of the subject (102*d*) previously transmitted to the system (1) through the electronic device (2) of the subject (105) and/or of previous electronic purchases (102*c*) of products or services and/or of feedback data (102*b*) of the subject (105), wherein the step of profiling of preferences of the user is destined to generate an electronic profile of preferences of the subject (102*e*) finalized to allow the generation of said proposal actions (1004, 1005).

According to another non-limiting aspect, the step of profiling of preferences of the user comprises an attribution of different weights to the electronic data of the subject (102*d*) and/or to data related to previous electronic purchases (102*c*) of products or services and/or of feedback data of the subject (102*b*).

According to another non-limiting aspect, said attribution is carried out through said profiling module of preferences of the user (102).

According to another non-limiting aspect, said weights are of adaptive type and/or time-varying.

According to another non-limiting aspect, the method comprises a step of loading of auxiliary electronic data from one or more external sources (108*a*, 108*b*), said external sources being different from said system (1), optionally comprising at least sources of public data and/or sources of data specific of the subject.

According to another non-limiting aspect, said external sources comprise positioning receivers, in particular global satellite positioning receivers.

According to another non-limiting aspect, in the step of data electronic processing (1003), the data processing engine (100) processes the auxiliary electronic data loaded from said one or more external sources (108*a*, 108*b*).

According to another non-limiting aspect, at least one of the proposal actions (1004, 1005), optionally at least the electronic proposition (1004) of personalized purchase services, is proposed and/or electronically altered basing on said auxiliary electronic data.

According to another non-limiting aspect, the method comprises a step of electronic proposition of an interactive and/or interpretative dialogue interface (106) on said electronic device (2), wherein the interactive and/or interpretative dialogue interface (106) is configured for:
 causing a loading of data of said first type of data on the system (1) and/or for receiving an electronic confirmation of the electronic proposition (1004) of personalized purchase services for the subject and/or of the proposition of a request of electronic payment (1005) and/or
 transmitting, towards the subject (105), messages logically associated to the loading of data of said first type of data on the system (1) and/or to the electronic confirmation.

According to another non-limiting aspect, the method comprises a step of at least partially automated electronic payment, optionally occurring after the step of data processing (1003) and/or after the proposition of a personalized electronic payment request (1005) of a predetermined amount.

According to another non-limiting aspect, in the step of electronic payment the system (1) electronically accesses to, and/or exchanges electronic data with, an entity (5) of electronic payment, optionally a bank institute and/or a bank card management institute and/or a financing institute, wherein the entity (5) manages at least a payment card, optionally a credit card, and/or a debit card and/or a prepaid card, and/or a bank account and/or an e-wallet and/or a cryptocurrency circuit and/or a service of digital payment and of money transfer through Internet, of the subject (105).

According to another non-limiting aspect, the step of electronic payment comprises the electronic selection, optionally automated, of a payment card, optionally a credit card, and/or a debit card and/or a prepaid card, and/or a bank account and/or an e-wallet and/or a cryptocurrency circuit and/or a service of digital payment and of money transfer through Internet associated to, and previously authorized by, said subject (105).

According to another non-limiting aspect, the method comprises the transmission of at least a proposal action (1004, 1005) by means of a software program or application (200) previously installed on board of said electronic device (2).

According to another non-limiting aspect, the transmission occurs towards said electronic device (2).

According to another non-limiting aspect, the step of electronic access (1000) to the system occurs by means of a software program or application (200) installed on board of the electronic device (2) and/or occurs by means of a step of proposition of a remote interface, optionally a web interface (200') towards the electronic device (2).

According to another non-limiting aspect, the method comprises a step of management of the software program or application (200) by said entity (5).

According to another non-limiting aspect, the method comprises, through the software program or application (200) and/or the remote interface, optionally the web interface (200'):
 a step of selective access of the subject (105) to a private profile, optionally wherein in said private profile is present said electronic profile of preferences of the subject (102*e*), and/or
 a step of transmission of data of said first type of data (20) towards the system (1) and/or towards the electronic device (2),
 a step of selective reception of at least part of the proposal actions (1004, 1005) selectively destined to the subject (105).

According to another non-limiting aspect, the software program or application (200) and/or the remote interface, optionally the web interface (200') act as gateway between the entity (5) and the system (1), optionally acting as gateway between the entity (5) and the data processing engine (100).

According to another non-limiting aspect, the method comprises a step of stochastic definition of said proposal actions (1004, 1005), wherein a stochastic definition module (104) defines and/or determines and/or stores one or more time instants in correspondence of which carrying out said proposal actions (1004, 1005) and/or, comprises a step of stochastic definition of at least an electronic payment, wherein a stochastic definition module (104) defines and/or determines and/or stores one or more time instants in correspondence of which carrying out the step of electronic payment.

According to another non-limiting aspect, the method comprises a step of definition of at least a criterion of feasibility of an electronic payment, in particular of at least a maximum payment threshold, optionally at least a maximum payment threshold of adaptive type, said at least a criterion of feasibility of an electronic payment, in particular said at least a maximum payment threshold, optionally said at least a maximum payment threshold of adaptive type, being at least temporarily stored in the system (1), in particular in a payment threshold decision module of said data processing engine (100).

According to another non-limiting aspect, the proposition of an electronic payment request (1005) is automatically followed by a step of execution of an electronic payment, without intervention of the subject, only when the amount to be paid through said electronic payment complies with at least one of said criteria of feasibility and, optionally, does not exceed at least one of said maximum payment thresholds.

According to another non-limiting aspect, the method comprises the definition of at least a proposition threshold value through a threshold management module (102a) of the data processing engine (100), said threshold value being destined to determine or prevent the at least partially automated execution of at least one of the proposal actions (1004; 1005).

According to another non-limiting aspect, the method, having fixed a determined electronic proposition and/or a determined type of electronic proposition, towards the subject (105), comprises a step of electronic computing of a number of approvals of electronic propositions towards the subject (105) or, alternatively, comprises a step of computing of a ratio between the number of approvals of said electronic propositions and a number of electronic propositions (1004) of personalized purchase services for the subject (105), optionally for a given segment of electronic payments.

According to another non-limiting aspect, the method, having fixed a determined electronic proposition and/or a predetermined type of electronic proposition, when the number of approvals of electronic propositions towards the subject (105) or, alternatively, the ratio between the number of approvals of said electronic propositions and a number of electronic propositions (1004) of personalized purchase services for the subject (105), decrease, at least for a predetermined time period, under a predetermined threshold value, comprises a step of switching and/or alteration and/or automatic annulation of a determined, and/or a determined type of, electronic proposition towards said subject (105).

According to another non-limiting aspect, said threshold value is function of, and/or is altered in function of, one or more actions of electronic confirmation of the electronic proposition (1004) of personalized purchase services for the subject and/or of the proposition of an electronic payment request (1005).

According to another non-limiting aspect, the activation of the electronic payment module (110) is subject to the reception of a determined input from the proposition module (103).

According to another non-limiting aspect, the activation of the electronic payment module (110) causes the activation of a products and/or services distribution module (109).

According to another non-limiting aspect, the activation of the electronic payment module (110) causes an electronic arrangement of an invoicing of amounts corresponding to the electronic payment, and/or causes a control of a distribution and/or a control of a delivery of products and/or services purchased by the subject (105), and/or causes the start of a step of digital type product and/or service transmission management towards a predefined electronic device, optionally wherein said predefined electronic device is the electronic device of the subject (105) and/or is an electronic device operatively associated to the subject (105), and/or causes the start of a step of distribution addresses management towards which distributing a product and/or service purchased through said electronic payment, and/or causes the electronic alerting of a distributing partner for the distribution of a physical product towards a predetermined address, said physical product having been purchased through the electronic payment.

According to another non-limiting aspect, the method comprises a transceiving of electronic data between the interactive and/or interpretative dialogue interface (106) and the products and/or services distribution module (109), optionally for the start of a distribution addresses management routine (109e) for the distribution of a product and/or service destined to be purchased and/or purchased with said proposition of an electronic payment request (1005).

According to another non-limiting aspect, the method comprises a transmission of data of execution of an electronic payment, wherein the transmission occurs from the proposition module (103) towards the electronic payment module (110).

According to another non-limiting aspect, the transmission of data of execution of an electronic payment occurs when said subject (105) has electronically provided to the system (1) an authorization for the automated payment.

According to another non-limiting aspect, said electronic confirmation is carried out by the subject through its own electronic device (2).

According to another non-limiting aspect, said method is a method implemented on a computer.

According to the present disclosure it is also described a method for providing purchase proposals and personalized and/or automated payment services to a subject, the method comprising:
- a step of electronic access (1000) to a personalized payment services provisioning system (1), the step of electronic access being carried out by means of an electronic device (2) operatively associated to the subject (105);
- a step of retrieval (1001) of at least a first type of electronic data (20) of said subject comprising payment data and/or deadlines and a data group (u) identifying one or more characteristics of the subject (105), said step of retrieval being carried out by said system (1) after said electronic access and comprising a reception of at least part of said first type of electronic data (20) from said electronic device (2) or from a third system (3);
- a step of storage (1002) of at least part of said first type of electronic data (20) within said system (1);
- a step of data electronic processing (1003), carried out after the step of retrieval (1001) of the at least a first type of electronic data (20), wherein a data processing engine (100) processes at least part of the first type of electronic data (20) stored within said system (1), said step of data electronic processing (1003) comprising a step of electronic profiling of the subject (105),
said method comprising an at least partially automated generation, and by means of the data processing engine (100), of a group, optionally a matrix or vector, (H) of proposals of services personalized for the subject (105) and/or of propositions of personalized electronic payment requests, and comprising a generation of at least one of the following proposal actions (1004; 1005):

an electronic proposition (1004) of said services personalized for the subject (105), for the purchase of at least a product and/or service, said electronic proposition (1004) occurring through an electronic transmission towards the electronic device (2) operatively associated to the subject (105);

a proposition of said personalized electronic payment request (1005) of a predetermined amount associated to the purchase of a product and/or service, wherein the amount is determined basing on said first type of electronic data (20) and/or basing on the processing carried out by the data processing engine (100); said proposal actions (1004; 1005) and said group (H) of proposals of services personalized for the subject (105) and/or of propositions of personalized electronic payment requests being based at least on at least part of said first type of electronic data (20) stored in the system (1) and/or on at least a preceding proposal action (1004; 1005) previously electronically processed through said data processing engine (100), said proposal actions (1004; 1005) and said group (H) of proposals of services personalized for the subject (105) and/or of propositions of personalized electronic payment requests being based in particular on at least a group, optionally on at least one between a matrix or vector, of feedback data ($O_f$, E), comprising feedback data provided by the subject (105) in relation to said preceding proposal action (1004; 1005), said group (H) of proposals comprising:

at least a proposal of services personalized for the subject (105) and/or at least a proposition of a personalized electronic payment request, and at least a characteristic associated to said proposal of services personalized for the subject (105) and/or to said proposition of a personalized electronic payment request.

According to another non-limiting aspect, said method is a method with artificial intelligence.

According to another non-limiting aspect, the method comprises:

a step of reception of feedback data provided by the subject (105) in relation to said preceding proposal action (1004; 1005), a step of generation, or of updating, of said group, optionally said at least one between a matrix or vector, of feedback data ($O_f$, E), after the step of reception and according to said feedback data provided by the subject (105), a step of updating of said group (H) of proposals using the data of said group, optionally said at least one between a matrix or vector, of feedback data ($O_f$, E).

According to another non-limiting aspect, the generation of the group (H) of proposals and/or the step of updating of the group (H) of proposals comprises an electronic processing of said feedback data group ($O_f$, E) through:

at least an artificial intelligence algorithm, in particular a reinforcement learning algorithm (r), and determines an at least temporary storage of a result data group, optionally a matrix or vector, (R) of the application of the artificial intelligence algorithm on the feedback data group ($O_f$, E);

optionally, an electronic filtering through at least a collaborative filtering algorithm (h) applied on the result data group (R) and at least on a filtered transaction data group, optionally a matrix or vector, ($P_T$), comprising a plurality of data of transactions (T) carried out by the subject (105), wherein, in the filtered transaction data group ($P_T$), the data of transactions (T) carried out by the subject (105) are electronically filtered by means of at least an analysis function of time series, optionally an analysis function of multivariate time series ($f$: T $\mapsto$ $P_T$.

According to another non-limiting aspect, said proposal actions (1004; 1005) and said group (H) of proposals of services personalized for the subject (105) and/or of propositions of personalized electronic payment requests are based on an electronic processing of at least part of the feedback data ($O_f$, E) through an application of:

a reinforcement learning algorithm (r) on said at least part of feedback data ($O_f$, E), the application of the reinforcement learning algorithm (r) producing an at least temporary storage of a result data group, optionally a matrix or vector, (R) of the result data of the application of the reinforcement learning algorithm (r) on the feedback data group ($O_f$, E), and, in sequence a collaborative filtering algorithm (h) applied on the result data group (R) and at least on a filtered transaction data group, optionally a matrix or vector, ($P_T$), comprising a plurality of data of transactions (T) carried out by the subject (105), wherein, in the filtered transaction data group ($P_T$), the data of transactions (T) carried out by the subject (105) are electronically filtered by means of at least an analysis function of time series, optionally an analysis function of multivariate time series ($f$: T $\mapsto$ $P_T$).

According to another non-limiting aspect, said filtered transaction data group ($P_T$) comprises at least a pattern of a transaction and at least a characteristic associated to said at least a transaction pattern.

According to another non-limiting aspect, said collaborative filtering algorithm (h) comprises at least one among the algorithms of the following list: nearest neighbors, matrix factorization, deep learning.

According to another non-limiting aspect, the step of data electronic processing (1003) comprises an analysis and/or processing of the typology and/or of the segmentation of electronic payments carried out by the subject (105) through the system (1).

According to another non-limiting aspect, the typology and/or the segmentation of electronic payments is electronically determined by applying at least a clustering algorithm (g: $U_{all} \mapsto P_u$), preferably at least one between a K-means algorithm and a DBSCAN algorithm, on a group, optionally a matrix, of clustered electronic data ($P_u$), comprising said data group (u) identifying one or more characteristics of the subject (105) and other groups of data identifying one or more characteristics of subjects different from said subject (105), and/or comprises an analysis and/or processing of data of specific preference of the subject (105), optionally directly received by the subject (105) and/or electronically extrapolated from previous electronic payments carried out by the subject (105) through the system (1), wherein said analysis and/or processing of data of specific preference of the subject (105) comprises the processing of a group, in particular a matrix, (I) of data, each one associated to one or more transactions, structured by hierarchy defined basing on a priority parameter ($MCC_\lambda$), and wherein, for each priority parameter, are associated one or more secondary parameters ($i_{\lambda\mu}$) identifying said transaction,
and/or comprises an analysis and/or processing of data deriving from sources (108a, 108b) external to the system (1),
and/or comprises an analysis and/or processing of request electronic data that the subject (105) sends to an interactive and/or interpretative dialogue interface (106) of the system (1).

According to another non-limiting aspect, the method comprises a step of processing of a data group, optionally a matrix, of transactions ($T_{all}$) identifying a global group of previously processed electronic transactions, wherein inside said transaction data group ($T_{all}$) a plurality of transactions, comprising a monetary value, are categorized in a hierarchical structure defined basing on a priority parameter ($\alpha_{m1}$), optionally the subject that has carried out the transaction, and wherein, for each priority parameter, are associated one or more secondary parameters ($\alpha_{1n}$, $\alpha_{mn}$) identifying the transaction.

According to another non-limiting aspect, the step of processing comprising an extraction, from said transaction data group ($T_{all}$), of said plurality of data of transactions (T) carried out by the subject (105).

According to another non-limiting aspect, the proposition of an electronic payment request (1005) comprises the activation of an electronic payment module (110) configured for allowing the execution of an electronic payment for the purchase of said product and/or service, optionally instead of the subject (105), wherein said electronic payment is generated by said proposition of a personalized electronic payment request (1005).

According to another non-limiting aspect, the activation of the electronic payment module (110) causes an electronic access to, and/or an exchange of electronic data with, an electronic payment entity (5), optionally a bank institute and/or a bank card, optionally credit cards, management institute and/or a financial institute to which the subject (105) has been previously electronically affiliated.

According to another non-limiting aspect, the proposition of the electronic payment request (1005), and/or the electronic payment, concerns a product and/or service proposed through said electronic proposition (1004).

According to another non-limiting aspect, the method comprises a step of electronic modelling of a behaviour of the subject, by means of the data processing engine (100), finalized to define an electronic model of behaviour for said subject, said electronic model being optionally electronically adaptive, said electronic model being based on at least part of the data (20) retrieved in the step of retrieval (1001) and/or basing on one or more actions of electronic confirmation of the electronic proposition (1004) of personalized purchase services for the subject and/or of the proposition of an electronic payment request (1005), said electronic confirmation being executed by the subject through its own electronic device (2).

According to another non-limiting aspect, said step of electronic modelling of the behaviour of the subject comprises a step of application of at least an evolutive computing algorithm (e), optionally comprising at least one among an agent-based type modelling algorithm, an evolutive-type modelling algorithm, and a particle swarm type optimizing algorithm, on at least one among, and preferably on the whole plurality of:
said group, in particular said matrix, (I) of data, associated each one to one or more transactions,
an amount threshold data group, in particular an amount threshold data matrix (S), optionally associated to at least one between a data of maximum number of repetitions of propositions by time range and a data related to said time range,
at least a part ($O_a$) of said at least a group, optionally at least a part of said at least one between a matrix or vector, of feedback data ($O_f$, E).

According to another non-limiting aspect, the method comprises a step of electronic selection, in particular a step of automated electronic selection, of a subgroup ($O_a$) of said feedback data group ($O_f$, E), said subgroup ($O_a$) of said feedback data group ($O_f$, E) comprising at least a purchase proposal previously electronically proposed and/or provided to said subject (102b) and electronically accepted by said subject (102b), optionally having caused said personalized electronic payment (1005).

According to another non-limiting aspect, the part ($O_a$) of said at least a feedback data group ($O_f$, E) comprises said subgroup ($O_a$) of said feedback data group ($O_f$, E).

According to another non-limiting aspect, the application of said evolutive computing algorithm (e) bringing to the creation of an intermediate result data group, optionally a matrix or vector (E).

According to another non-limiting aspect, said subgroup ($O_a$) of said feedback data group ($O_f$, E) and/or the part ($O_a$) of said at least a feedback data group ($O_f$, E) is respectively an enriched subgroup and/or a part and comprising parameters related to a transaction already carried out by said subject, said parameters being extracted from the data group, optionally from the matrix or vector, (R) of result of the application of the reinforcement learning algorithm (r) on the feedback data group ($O_f$, E) and/or being extracted from said intermediate result data group, optionally from said matrix or vector, (E), and/or being extracted from said group, optionally said matrix or vector, (H) of proposals of services personalized for the subject (105).

According to another non-limiting aspect, the method comprises:
a step of electronic definition of a plurality of segments (101e), of behaviour of subjects, wherein said segments (101e) define and/or categorize levels of electronic payment and/or type of products or services purchased through electronic payment.

According to another non-limiting aspect, the application of said clustering algorithm follows said step of electronic definition of the plurality of segments (101e).

According to another non-limiting aspect, the electronic filtering through the at least a collaborative filtering algorithm (h) determines the execution of:
a step of electronic definition of a plurality of patterns associated to products and/or services purchased through electronic payment, said patterns defining geographical locations associated to products and/or services purchased through said electronic payment,
a step of assignment of at least a pattern of said plurality of patterns to the electronic model of behaviour of said subject and/or a step of logical association between the electronic model of behaviour of said subject with a specific pattern of the plurality of patterns.

According to another non-limiting aspect, said electronic filtering through at least a collaborative filtering algorithm (h) is applied to the result data group (R), on the group, optionally on the matrix or vector, ($P_T$) of filtered transaction data, and on a subgroup of said group, optionally said matrix, of clustered electronic data ($P_u$), wherein said subgroup comprises a data cluster ($p_u$) identifying a predetermined class of subjects to which said subject (105) is electronically paired with a criterion of maximum likelihood.

According to another non-limiting aspect, said group of clustered electronic data ($P_u$) comprises a plurality of clusters ($pu_{11}\text{-}pu_{\alpha 1}, \ldots, pu_{1\beta}\text{-}p_{\alpha\beta}$) identifying respective classes of the subject, wherein, optionally, each class contains personal data of the subject and/or data related to a merchant category used on average and/or a merchant category code (MCC) used on average for electronic purchases and/or place and/or time data to which the electronic purchases are referred.

Distributed Computing Environment

According to another aspect, it is also described a distributed computing environment configured for carrying out one or more steps of the method according to the present aspects.

System

According to another aspect it is also described a system (1) for providing purchase proposals and personalized and/or automated payment services to a subject (105), wherein the system comprises:

an electronic interface configured for allowing an electronic device (2) operatively associated to a subject (105) to carry out an electronic access (1000) to the system (1);

wherein said system (1) is configured for:

retrieving (1001), after the electronic access (1000) of the electronic device (2), at least a first type of electronic data (20) of said subject comprising payment data and/or deadlines, through a reception of at least part of said first type of electronic data (20) from said electronic device (2) or from a third system (3), and for storing electronic data belonging to said subject, and storing (1002) at least part of said first type of electronic data (20);

wherein said system (1) comprises a data processing engine (100) configured for carrying out a data electronic processing (1003) carried out on at least part of the first type of electronic data (20) stored and carried out after the retrieval (1001) of the at least a first type of electronic data (20), and for carrying out a generation, at least partially automated, of at least one of the following proposal actions (1004; 1005):

a transmission, towards the electronic device (2), of an electronic proposition (1004) of services personalized for the subject (105), for the purchase of at least a product and/or service, said electronic proposition (1004) occurring through an electronic transmission towards the electronic device (2) operatively associated to the subject (105);

a transmission, towards the electronic device (2), of a proposition of a personalized electronic payment request (1005) of a predetermined amount, associated to the purchase of a product and/or service, wherein the amount is determined basing on said first type of electronic data (20) and/or basing on the processing carried out by the data processing engine (100);

said proposal actions (1004; 1005) being based at least on at least part of said first type of electronic data (20) stored in the system (1) and/or on at least a preceding proposal action (1004; 1005) previously electronically processed through said data processing engine (100).

According to another aspect it is also described a system (1) for providing purchase proposals and personalized and/or automated payment services to a subject (105), wherein the system comprises:

an electronic interface configured for allowing an electronic device (2) operatively associated to a subject (105) to carry out an electronic access (1000) to the system (1);

wherein said system (1) is configured for:

retrieving (1001), after the electronic access (1000) of the electronic device (100), at least a first type of electronic data (20) of said subject comprising payment data and/or deadlines, through a reception of at least part of said first type of electronic data (20) from said electronic device (2) or from a third system (3), and for storing electronic data belonging to said subject, and storing (1002) at least part of said first type of electronic data (20);

wherein said system (1) comprises a data processing engine (100) configured for carrying out a data electronic processing (1003) carried out on at least part of the first type of electronic data (20) stored and carried out after the retrieval (1001) of the at least a first type of electronic data (20), and for carrying out a generation, at least partially automated, of the following proposal actions (1004; 1005):

a transmission, towards the electronic device (2), of an electronic proposition (1004) of services personalized for the subject (105), for the purchase of at least a product and/or service, said electronic proposition (1004) occurring through an electronic transmission towards the electronic device (2) operatively associated to the subject (105);

a transmission, towards the electronic device (2), of a proposition of a personalized electronic payment request (1005) of a predetermined amount associated to the purchase of a product and/or service, wherein the amount is determined basing on said first type of electronic data (20) and/or basing on the processing carried out by the data processing engine (100);

and wherein the system (1) comprises an electronic payment module (110) configured for allowing the execution of an electronic payment for the purchase of said product and/or service after at least said proposition of an electronic payment request (1005), said proposal actions (1004; 1005) being based at least on at least part of said first type of electronic data (20) stored in the system (1) and/or on at least a preceding proposal action (1005) previously electronically processed through said data processing engine (100).

According to another non-limiting aspect, the data processing engine (100) is configured for carrying out, in the step of data electronic processing (1003), an analysis and/or processing of the typology and/or of the segmentation of electronic payments carried out by the subject (105) through the system (1), and/or an analysis and/or processing of data of specific preference of the subject (105), optionally directly received by the subject (105) and/or electronically extrapolated from previous electronic payments carried out by the subject (105) through the system (1), and/or an analysis and/or processing of data deriving from sources (108a, 108b) external to the system (1), and/or an analysis and/or processing of request electronic data that the subject (105) sends to an interactive and/or interpretative dialogue interface (106) of the system (1).

According to another non-limiting aspect, the system (1) comprises at least an electronic payment module (110)

configured for allowing the execution of an electronic payment for the purchase of said product and/or service, optionally instead of the subject (105), wherein said electronic payment is generated by said proposition of a personalized electronic payment request (1005), and wherein the electronic payment module (110) is configured for being activated at least through the proposition of an electronic payment request (1005).

According to another non-limiting aspect, the electronic payment module (110) is operatively connected to, and/or is configured for exchanging electronic data with, an electronic payment entity (5), optionally a bank institute and/or a bank card, optionally credit card, management institute, and/or a financial institute to which the subject (105) has been previously electronically affiliated.

According to another non-limiting aspect, the electronic payment module (110) is configured for carrying out said electronic payment without the intervention of the subject (105) and/or for forcing said entity (5) to the execution of said electronic payment.

According to another non-limiting aspect, the proposition of the electronic payment request (1005), and/or the electronic payment, concerns a product and/or service proposed through said electronic proposition (1004).

According to another non-limiting aspect, the system (1) comprises a products and/or services distribution module (109) operatively connected to the electronic payment module (110) and configured for being at least activated by action of the electronic payment module (110).

According to another non-limiting aspect, the electronic payment module (110) is configured for causing an electronic arrangement of an invoicing of amounts corresponding to the electronic payment, and/or is configured for causing a control of a distribution and/or a control of a delivery of products and/or services purchased by the subject (105), and/or for causing the start of a step of digital type product and/or service transmission management towards a predefined electronic device, optionally wherein said predefined electronic device is the electronic device of the subject (105) and/or is an electronic device operatively associated to the subject (105), and/or for causing the start of a step of management of distribution addresses towards which distributing a product and/or service purchased through said electronic payment, and/or causes the electronic alerting of a distributing partner for the distribution of a physical product towards a predetermined address, said physical product having been purchased through the electronic payment.

According to another non-limiting aspect, the system (1), in particular the data processing engine (100), is configured for carrying out a classification of electronic payments at least according to a predefined merchant category and/or a Merchant Category Code (MCC), and/or is configured for carrying out an electronic segmentation of electronic payments carried out through the system (1) according to at least a predefined merchant category and/or a Merchant Category Code (MCC), and/or for carrying out an assignment of a predefined merchant category and/or a Merchant Category Code (MCC), to each electronic payment.

According to another non-limiting aspect, said expense average typology is associated to said predefined merchant category and/or to said Merchant Category Code.

According to another non-limiting aspect, the system (1) is configured for carrying out an electronic extrapolation of a particular typology of products and/or services previously purchased by means of an electronic payment, optionally wherein the step of electronic extrapolation comprises an analysis of the predefined merchant category, and/or an analysis of the Merchant Category Code (MCC), and/or of the vendor name associated to said electronic payment, for obtaining additional electronic information inherent to details of the typology of products or services.

According to another non-limiting aspect, the expense average typology comprises said typology of products or services.

According to another non-limiting aspect, the system (1), in particular the identification module of patterns and/or segments (101), is configured for carrying out a categorization of the expense average typology on more levels nested among them, said levels comprising each one a plurality of options.

According to another non-limiting aspect, the system (1), in particular the identification module of patterns and/or segments (101), is configured for carrying out an assignment of a predefined electronic payment to one of said levels and/or options based on the analysis of the predefined merchant category, and/or on the analysis of the Merchant Category Code and/or on further electronic extrapolations carried out starting from said predefined merchant category, and/or carried out starting from said Merchant Category Code.

According to another non-limiting aspect, the data processing engine (100) comprises at least a profiling module (101, 102) configured for carrying out an electronic modelling of a subject finalized to define an electronic model of behaviour for said subject, said electronic model of behaviour of the subject being optionally electronically adaptive.

According to another non-limiting aspect, said electronic model of behaviour of the subject is based on at least part of the data (20) retrieved in the step of retrieval (1001) and/or basing on one or more actions of electronic confirmation of the electronic proposition (1004) of personalized purchase services for the subject and/or of the proposition of an electronic payment request (1005), said electronic confirmation being carried out by the subject through its own electronic device (2).

According to another non-limiting aspect, the profiling module (101, 102) comprises an identification module of patterns and/or segments (101), configured at least for:

electronically defining a plurality of segments (101e) of behaviour of subjects, wherein said segments (101e) define and/or categorize levels of electronic payment and/or type of products or services purchased through an electronic payment, and for assigning at least a segment of said plurality of segments (101e) to the electronic model of behaviour of the subject and/or for logically associating (101f) the electronic model of behaviour of said subject with a specific segment of the plurality of segments (101e), and/or for electronically defining a plurality of patterns associated to products and/or services purchased through electronic payment, said patterns defining geographic locations associated with products and/or services purchased through said electronic payment, and for assigning at least a pattern of said plurality of patterns to the electronic model of behaviour of said subject and/or for logically associating the electronic model of behaviour of said subject with a specific pattern of the plurality of patterns.

According to another non-limiting aspect, the segments define and/or categorize the expense behaviour of the subject (105) in terms of classification of expense average amount and/or in terms of expense average typology.

According to another non-limiting aspect, said patterns are destined to define and/or categorize an expense behaviour of the subject (105) in terms of time and execution locations of an electronic payment.

According to another non-limiting aspect, the profiling module (101, 102) comprises at least a profiling module of preferences of the user (102) configured for electronically processing electronic data of the subject (102*d*) previously transmitted to the system (1) through the electronic device (2) of the subject (105) and/or previous electronic purchases (102*c*) of products or services and/or of feedback data (102*b*) of the subject (105), and for generating an electronic profile of preference of the subject (102*e*) finalized to allow the generation of said proposal actions (1004, 1005).

According to another non-limiting aspect, the profiling module of preferences of the user (102) is configured for attributing different weights to the electronic data of the subject (102*d*) and/or to data related to previous electronic purchases (102*c*) of products or services and/or to feedback data of the subject (102*b*).

According to another non-limiting aspect, said weights are of adaptive type and/or time-varying.

According to another non-limiting aspect, the identification module of patterns and/or segments (101) integrates, or is connected with, an artificial intelligence and/or machine learning engine configured for defining and/or attributing patterns and/or segments.

According to another non-limiting aspect, the data processing engine (100) comprises a proposition module (103) configured for producing in output at least a proposal action (1004; 1005) and receiving in input at least the electronic model of behaviour of the subject and/or a specific segment of the plurality of segments (101*e*) from the identification module of patterns and/or segments (101), and/or an electronic profile of preference of the subject (102*e*) from the profiling module of preferences of the user (102).

According to another non-limiting aspect, the data processing engine (100) comprises an enrichment module (108) configured for loading auxiliary electronic data retrieved from one or more external sources (108*a*, 108*b*), said auxiliary electronic data comprising public data and/or specific data of the subject, and wherein the proposition module (103) receives in input auxiliary electronic data deriving from said enrichment module (108).

According to another non-limiting aspect, the data processing engine (100) comprises an interactive and/or interpretative dialogue interface (106) configured for:
- causing a loading of data of said first type of data on the system (1) and/or for receiving an electronic confirmation of the electronic proposition (1004) of personalized purchase services for the subject and/or of the proposition of an electronic payment request (1005) and/or
- transmitting messages logically associated to the loading of data of said first type of data on the system (1) and/or to the electronic confirmation.

According to another non-limiting aspect, the electronic payment module (110) is configured for carrying out, and/or for allowing the execution of, an electronic payment of said product and/or service in at least partially automated manner.

According to another non-limiting aspect, said electronic payment module (110) is configured for electronically accessing to, and/or exchanging electronic data with, an entity (5) of electronic payment, optionally a bank institute and/or a bank card management institute and/or a financing institute.

According to another non-limiting aspect, the entity (5) manages at least a payment card, optionally a credit card, and/or a debit card and/or a prepaid card, and/or a bank account and/or an e-wallet and/or a cryptocurrency circuit and/or a service of digital payment and of money transfer through Internet, of the subject (105).

According to another non-limiting aspect, said electronic payment module (110) is configured for causing the execution of an electronic payment through an electronic selection, optionally automated, of a payment card, optionally a credit card, and/or a debit card and/or a prepaid card, and/or a bank account and/or an e-wallet and/or a cryptocurrency circuit and/or a service of digital payment and of money transfer through Internet associated to, and previously authorized by, said subject (105).

According to another non-limiting aspect, the electronic payment module (110) is configured for being activated depending on the reception of a predetermined input from the proposition module (103).

According to another non-limiting aspect, said input comprises at least execution data of an electronic payment.

According to another non-limiting aspect, the proposition module (103) is configured for transmitting said electronic payment execution data towards the payment module (110) only when said subject (105) has electronically provided to the system (1) an authorization of automated payment.

According to another non-limiting aspect, the system (1) comprises a products and/or services distribution module (109) configured for and specifically destined to cause an electronic arrangement of an invoicing of amounts corresponding to the electronic payment, and/or to cause a control of a distribution and/or a control of a delivery of products and/or services purchased by the subject (105), and/or to cause the start of a step of digital type product and/or service transmission management towards a predefined electronic device, optionally wherein said predefined electronic device is the electronic device of the subject (105) and/or is an electronic device operatively associated to the subject (105), and/or to cause the start of a step of distribution addresses management towards which distributing a product and/or service purchased through said electronic payment, and/or to cause the electronic alerting of a distributing partner for the distribution of a physical product towards a predetermined address, said physical product having been purchased through the electronic payment.

According to another non-limiting aspect, the system (1) comprises a software program or application (200) configured for being installed on the electronic device (2) and/or comprises a remote interface, optionally a web interface (200') for allowing an access to the system (1) at least from the electronic device (2).

According to another non-limiting aspect, the software program or application (200) and/or the remote interface, optionally the web interface (200'), acts as gateway at least between:
- an entity (5) of electronic payment, optionally a bank institute and/or a bank card management institute and/or a financing institute, wherein the entity (5) manages at least a payment card, optionally a credit card, and/or a debit card and/or a prepaid card, and/or a bank account and/or an e-wallet and/or a cryptocurrency circuit and/or a service of digital payment and of money transfer through Internet, of the subject (105), and
- the system (1), optionally the data processing engine (100).

According to another non-limiting aspect, the software program or application (200) and/or the remote interface, optionally the web interface (200') are configured at least for:
- allowing a selective access of the subject (105) to a private profile, optionally wherein in said private profile is present said electronic profile of preference of the subject (102e), and/or
- transmitting the data of said first type of data (20) towards the system (1) and/or towards the electronic device (2), selectively receiving at least part of the proposal actions (1004, 1005) selectively destined to the subject (105).

According to another non-limiting aspect, the data processing engine comprises a stochastic definition module (104) configured for causing the stochastic definition of said proposal actions (1004, 1005), said stochastic definition module (104) defining and/or determining and/or storing one or more time instants in correspondence of which carrying out said proposal actions (1004, 1005) and/or being configured for defining and/or determining and/or storing one or more time instants in correspondence of which carrying out the electronic payment.

According to another non-limiting aspect, the data processing engine (100) comprises a payment threshold decision module, configured for determining and/or for storing at least temporarily, at least a criterion of feasibility of an electronic payment, in particular of at least a maximum payment threshold, optionally at least a maximum payment threshold of adaptive type.

According to another non-limiting aspect, said payment threshold decision module is configured for causing the execution of an electronic payment, without intervention of the subject, only when the amount to be paid through said electronic payment complies with at least one of said criteria of feasibility and, optionally, does not exceed at least one of said maximum payment thresholds.

According to another non-limiting aspect, the data processing engine comprises at least a threshold management module (102a) configured for causing the definition of at least a proposition threshold value destined to determine or prevent the at least partially automated execution of at least one of the proposal actions (1004, 1005).

According to another non-limiting aspect, the threshold management module (102a), having fixed a determined electronic proposition and/or a determined type of electronic proposition, towards the subject (105), is configured for carrying out an electronic computing of a number of approvals of electronic propositions towards the subject (105) or, alternatively, is configured for carrying out a computing of a ratio between the number of approvals of said electronic propositions and a number of electronic propositions (1004) of personalized purchase services for the subject (105), optionally for a given segment of electronic payments.

According to another non-limiting aspect, the system (1), in particular the data processing engine (100), having fixed a determined electronic proposition and/or a predetermined type of electronic proposition, when the number of approvals of electronic propositions towards the subject (105) or, alternatively, the ratio between the number of approvals of said electronic propositions and a number of electronic propositions (1004) of personalized purchase services for the subject (105), decrease, at least for a predetermined time period, under a predetermined threshold value, comprises a step of switching and/or alteration and/or automatic annulation of a determined, and/or a determined type of, electronic proposition towards said subject (105).

According to another non-limiting aspect, said threshold value is function of, and/or is altered in function of, one or more actions of electronic confirmation of the electronic proposition (1004) of personalized purchase services for the subject and/or of the proposition of an electronic payment request (1005).

According to another non-limiting aspect, said electronic confirmation is carried out by the subject through its own electronic device (2).

According to another non-limiting aspect, said system (1) is a distributed computing environment.

According to the present disclosure it is also described a system (1) for providing purchase proposals and personalized and/or automated payment services to a subject (105), wherein the system (1) comprises an electronic interface configured for allowing an electronic device (2) operatively associated to a subject (105) to carry out an electronic access (1000) to the system (1); and wherein said system (1) is configured for:
- retrieving (1001), after the electronic access (1000) of the electronic device (100), at least a first type of electronic data (20) of said subject comprising payment data and/or deadlines and a data group (u) identifying one or more characteristics of the subject (105), through a reception of at least part of said first type of electronic data (20) from said electronic device (2) or from a third system (3), and
- storing (1002) at least part of said first type of electronic data (20);

wherein said system (1) comprises a data processing engine (100) configured for carrying out a data electronic processing (1003) carried out on at least part of the first type of electronic data (20) stored and carried out after the retrieval (1001) of the at least a first type of electronic data (20), said data electronic processing (1003) determining an electronic profiling of the subject (105), for carrying out a generation, at least partially automated, of a group, optionally a matrix or vector, (H) of propositions of services personalized for the subject (105) and/or of propositions of personalized electronic payment requests and for carrying out at least one of the following proposal actions (1004; 1005):
- an electronic proposition (1004) of said services personalized for the subject (105), for the purchase of at least a product and/or service, said electronic proposition (1004) occurring through an electronic transmission towards the electronic device (2) operatively associated to the subject (105);
- a proposition of said personalized electronic payment request (1005) of a predetermined amount, associated to the purchase of a product and/or service, wherein the amount is determined basing on said first type of electronic data (20) and/or basing on the processing carried out by the data processing engine (100);
- said proposal actions (1004; 1005) and said group (H) of propositions of services personalized for the subject (105) and/or of propositions of personalized electronic payment requests being based at least on at least part of said first type of electronic data (20) stored in the system (1) and/or on at least a preceding proposal action (1004; 1005) previously electronically processed through said data processing engine (100) in particular on at least a group, optionally on at least one between a matrix or vector, of feedback data ($O_f$, E), comprising feedback data provided by the subject (105) in relation to said preceding proposal action (1004; 1005), said group (H) of propositions comprising:
at least a proposition of services personalized for the subject (105) and/or at least a proposition of a personalized electronic payment request, and
at least a characteristic associated to said proposition of services personalized for the subject (105) and/or to said proposition of personalized electronic payment request.

According to another non-limiting aspect, said system is a system with artificial intelligence.

According to another non-limiting aspect, the data processing engine (101) is configured for:
receiving said feedback data provided by the subject (105) in relation to said preceding proposal action (1004; 1005),
generating or updating, said group, optionally said at least one between a matrix or vector, of feedback data ($O_f$, E), after the reception of, and according to, said feedback data provided by the subject (105),
updating said group (H) of proposals using the data of said group, optionally said at least one between a matrix or vector, of feedback data ($O_f$, E).

According to another non-limiting aspect, said data processing engine (100) comprises at least a profiling module (101, 102) configured for carrying out an electronic modelling of a subject finalized to define an electronic model of behaviour for said subject.

According to another non-limiting aspect, said data processing engine (100), optionally said profiling module (101, 102), is configured for generating the group (H) of proposals and/or updating the group (H) of proposals by carrying out an electronic processing of said feedback data group ($O_f$, E) comprising:
the application of at least an artificial intelligence algorithm, in particular a reinforcement learning algorithm (r), the system (1) being configured for carrying out an at least temporary storage of a group, optionally a matrix or vector, (R) of result data of the application of the artificial intelligence algorithm on the feedback data group ($O_f$, E);
optionally, an electronic filtering through at least a collaborative filtering algorithm (h) applied on the result data group (R) and at least on a filtered transaction data group, optionally a matrix or vector, ($P_T$), comprising a plurality of data of transactions (T) carried out by the subject (105), wherein, in the filtered transaction data group ($P_T$), the data of transactions (T) carried out by the subject (105) are electronically filtered by means of at least an analysis function of time series, optionally an analysis function of multivariate time series ($f: T \mapsto P_T$).

According to another non-limiting aspect, said data processing engine (100), optionally said profiling module (101, 102), is configured for generating the group (H) of proposals and/or updating the group (H) of proposals carrying out an electronic processing of at least part of the feedback data ($O_f$, E) comprising an application of:
a reinforcement learning algorithm (r) on said at least part of feedback data ($O_f$, E), the application of the reinforcement learning algorithm (r) producing an at least temporary storage of a group, optionally a matrix or vector, (R) of result data of the application of the reinforcement learning algorithm (r) on the feedback data group ($O_f$, E), and, in sequence
a collaborative filtering algorithm (h) applied on the result data group (R) and at least on a filtered transaction data group, optionally a matrix or vector, ($P_T$), comprising a plurality of data of transactions (T) carried out by the subject (105), wherein, in the filtered transaction data group ($P_T$), the data of transactions (T) carried out by the subject (105) are electronically filtered by means of at least an analysis function of time series, optionally an analysis function of multivariate time series ($f: T \mapsto P_T$)

According to another non-limiting aspect, said filtered transaction data group ($P_T$) comprising at least a pattern of a transaction and at least a characteristic associated to said at least a transaction pattern.

According to another non-limiting aspect, wherein said collaborative filtering algorithm (h) comprises at least one among the algorithms of the following list: nearest neighbors, matrix factorization, deep learning.

According to another non-limiting aspect, the data processing engine (100) is configured for carrying out, in the step of data electronic processing (1003):
an analysis and/or processing of the typology and/or of the segmentation of electronic payments carried out by the subject (105) through the system (1), wherein the typology and/or the segmentation of electronic payments is electronically determined by applying at least a clustering algorithm (g: $U_{all} \mapsto P_u$), preferably at least one between a K-means algorithm and a DBSCAN algorithm, on a group, optionally a matrix, of clustered electronic data (Pa), comprising said data group (u) identifying one or more characteristics of the subject (105) and other groups of data identifying one or more characteristics of subjects different from said subject (105), and/or
an analysis and/or processing of data of specific preference of the subject (105), optionally directly received by the subject (105) and/or electronically extrapolated from previous electronic payments carried out by the subject (105) through the system (1), wherein said analysis and/or processing of data of specific preference of the subject (105) comprises the processing of a group, in particular a matrix, (I) of data, each one associated to one or more transactions, structured by hierarchy defined basing on a priority parameter ($MCC_\lambda$), and wherein, for each priority parameter, are associated one or more secondary parameters ($i_{\lambda,\mu}$) identifying said transaction, and/or
an analysis and/or processing of data deriving from sources (108a, 108b) external to the system (1), and/or an analysis and/or processing of request electronic data that the subject (105) sends to an interactive and/or interpretative dialogue interface (106) of the system (1).

According to another non-limiting aspect, the data processing engine (100) is configured for carrying out a processing of a data group, optionally a matrix, of transactions ($T_{all}$) identifying a global group of previously processed electronic transactions, wherein inside said transaction data group ($T_{all}$) a plurality of transactions, comprising a monetary value, are categorized in a hierarchical structure defined basing on a priority parameter ($\alpha_{m1}$), optionally the subject that has carried out the transaction, and wherein, for each priority parameter, are associated one or more secondary parameters ($\alpha_{1n}$, $\alpha_{mn}$) identifying the transaction.

According to another non-limiting aspect, the processing comprises an extraction, from said transaction data group ($T_{all}$), of said plurality of data of transactions (T) carried out by the subject (105).

According to another non-limiting aspect, the system comprises at least an electronic payment module (110) configured for allowing the execution of an electronic payment for the purchase of said product and/or service, optionally instead of the subject (105), wherein said electronic payment is generated by said proposition of a personalized electronic payment request (1005), and wherein the electronic payment module (110) is configured for being activated at least through the proposition of an electronic payment request (1005).

According to another non-limiting aspect, the electronic payment module (110) is operatively connected to a, and/or is configured for exchanging electronic data with, an electronic payment entity (5), optionally a bank institute and/or a bank card, optionally credit card, management institute, and/or a financial institute to which the subject (105) has been previously electronically affiliated.

According to another non-limiting aspect, the proposition of the electronic payment request (1005), and/or the electronic payment, concerns a product and/or service proposed through said electronic proposition (1004).

According to another non-limiting aspect, the data processing engine (100) comprises at least a profiling module (101, 102) configured for carrying out an electronic modelling of a subject finalized to define an electronic model of behaviour for said subject and said profiling module (101, 102) is configured for applying at least an evolutive computing algorithm (e), optionally comprising at least one among an agent-based type modelling algorithm, an evolutive-type modelling algorithm, and a particle swarm type optimizing algorithm, on at least one among, and preferably on the whole plurality of:
- said group, in particular said matrix, (I) of data, associated each one to one or more transactions,
- an amount threshold data group, in particular an amount threshold data matrix (S), optionally associated to at least one between a data of maximum number of repetitions of propositions by time range and a data related to said time range,
- at least a part ($O_a$) of said at least a group, optionally at least a part of said at least one between a matrix or vector, of feedback data ($O_f$, E).

According to another non-limiting aspect, the system, preferably the profiling module (101, 102), is configured for selecting, optionally automatically, a subgroup ($O_a$) of said feedback data group ($O_f$, E), said subgroup ($O_a$) of said feedback data group ($O_f$, E) comprising at least a purchase proposal proposed and/or previously electronically provided to said subject (102b) and electronically accepted by said subject (102b), optionally having caused said personalized electronic payment (1005).

According to another non-limiting aspect, the part of said at least a feedback data group ($O_f$ E) comprises said subgroup ($O_a$) of said feedback data group ($O_f$, E).

According to another non-limiting aspect, the profiling module (101, 102) comprises an identification module of patterns and/or segments (101), configured at least for electronically defining a plurality of segments (101e) of behaviour of subjects, wherein said segments (101e) define and/or categorize levels of electronic payment and/or type of products or services purchased through electronic payment, and for assigning at least a segment of said plurality of segments (101e) to the electronic model of behaviour of the subject and/or for logically associating (101f) the electronic model of behaviour of said subject with a specific segment of the plurality of segments (101e).

According to another non-limiting aspect, the application of said clustering algorithm follows said step of electronic definition of the plurality of segments (101e).

According to another non-limiting aspect, in the profiling module (101, 102) the identification module of patterns and/or segments (101), configured at least for:
- electronically defining a plurality of patterns associated to products and/or services purchased through electronic payment, said patterns defining geographical locations associated to products and/or services purchased through said electronic payment, and for
- assigning at least a pattern of said plurality of patterns to the electronic model of behaviour of said subject and/or for logically associating the electronic model of behaviour of said subject with a specific pattern of the plurality of patterns, through said at least a collaborative filtering algorithm (h).

According to another non-limiting aspect, said electronic filtering through at least a collaborative filtering algorithm (h) is applied to the result data group (R), on the group, optionally on the matrix or vector, ($P_T$) of filtered transaction data, and on a subgroup of said group, optionally said matrix, of clustered electronic data ($P_u$), wherein said subgroup comprises a data cluster ($p_u$) identifying a predetermined class of subjects to which said subject (105) is electronically paired with a criterion of maximum likelihood.

According to another non-limiting aspect, said group of clustered electronic data ($P_u$) comprises a plurality of clusters ($pu_{11}$-$pu_{\alpha1}$, ..., $pu_{1\beta}$-$p_{\alpha\beta}$) identifying respective classes of the subject, wherein, optionally, each class contains personal data of the subject and/or data related to a merchant category used on average and/or to merchant category code (MCC) used on average for electronic purchases and/or place and/or time data to which the electronic purchases are referred.

Program for Computer

According to another aspect, it is here described a program for computer, comprising portions of software code which when executed cause the execution of one or more of the steps of the method here described.

DESCRIPTION OF FIGURES

The description herein follows with the showing of one or more preferred and non-limiting embodiments, which refer to the attached figures. In these figures, in particular.

DETAILED DESCRIPTION

Figure 1:
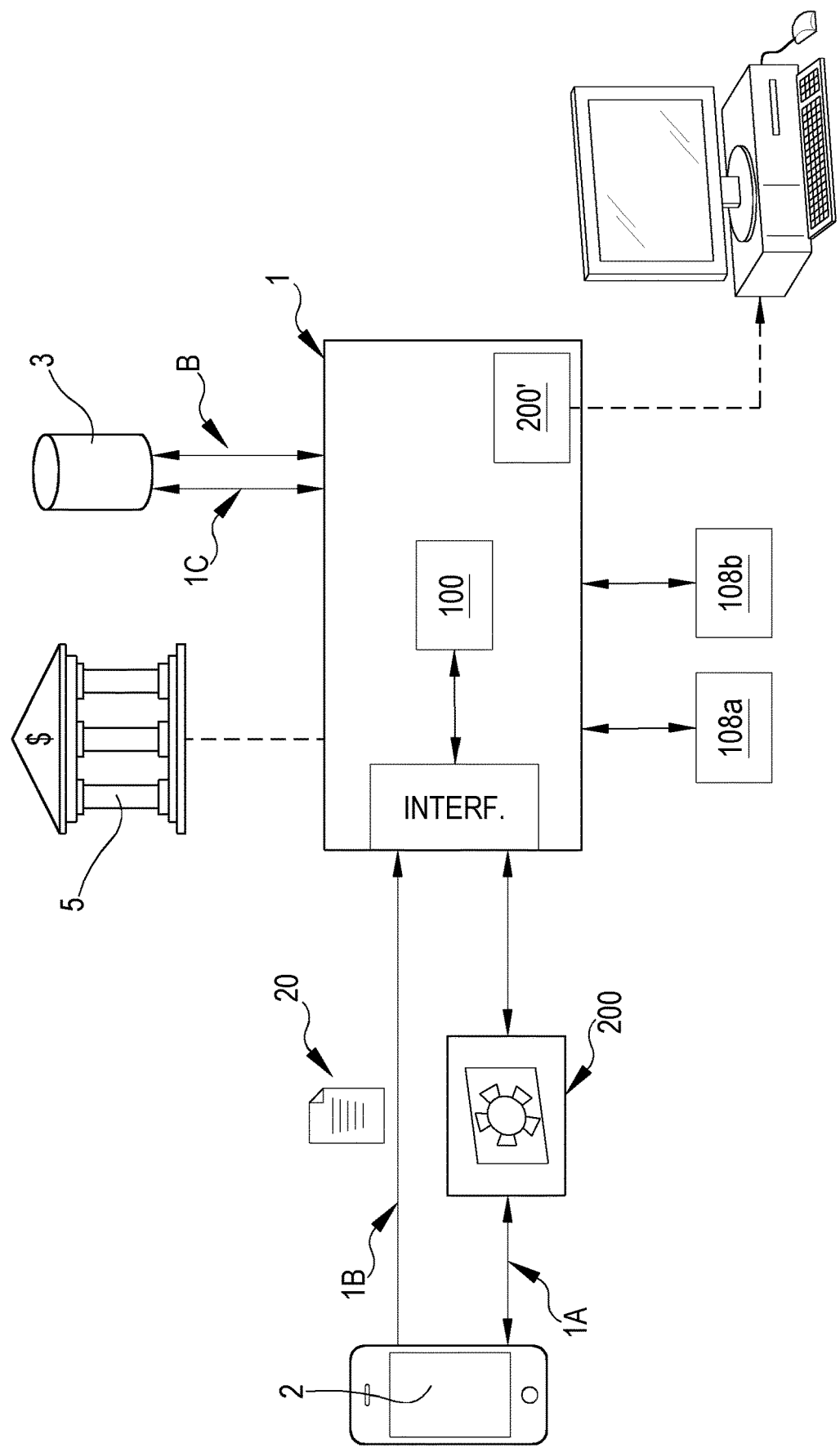
FIG. 1 shows a schematic representation of part of the elements composing the system object of the present disclosure.

The present disclosure concerns a system for providing purchase proposals and personalized and/or automated payment services to a subject. The present disclosure also concerns the equivalent method, in particular implemented through computer, executed by the above described system. As it will be better clarified in the description, the system (and thus the method) involve the use of artificial intelligence.

A non-exhaustive list of personalized services which can be offered through the system object of the present disclosure includes at least one among the following services: travel booking, booking or rental of vehicles for the execution of travels, the provision of maintenance services, optionally for the home and/or office, the purchase of goods on behalf of the subject, the booking of cleaning and/or disinfection services, the booking of restaurant services, the booking of cosmetic services, the booking of medical and/or health transportation services, the contact with repairers of goods, the contracting of insurance services for goods or for individuals or legal entities, the purchase and/or temporary rental of multimedia items optionally comprising music and/or video, the purchase and/or transfer of financial products.

The system 1 is first of all operatively connected with an electronic device 2, such as for example and non-limiting thereto a mobile phone or a personal computer in the possession of a predetermined subject 105, upon which a software application or a software program is typically installed, identified with the numerical reference 200, which allow the opening of a logical channel towards the system 1. This logical channel is kept at least temporarily and, preferably is of safe type (for example, the data that move on it are encrypted data). Thus, even if non-limiting thereto, the software application installed on the electronic device 2 causes, preferably, the instauration of a safe and/or encrypted communication channel, in order to ensure the opportune sensitive data transmission privacy of the subject 105. This logical channel is configured for allowing a bidirectional communication (or equivalently a data transceiving) between the system 1 and the electronic device 2.

According to the present disclosure, for "operatively connected" is intended an electronic device, or a system, connected with another electronic device or system such as to keep operative for a predefined time a connection through which the device or system can transmit and/or receive from the other device or system, a plurality of electronic data, herein included vocal communication data.

Since the software application is capable of exchanging data having relevant privacy value with the subject 105, in a preferred and non-limiting embodiment the system 1 can provide for a routine of mobile certification or anyhow of the electronic device 2 upon which the software application is installed. In an embodiment, preferably, but non-limiting thereto, the routine comprises the introduction, by the subject 105 and through the software application, of a mobile telephone number. This mobile telephone number, except in cases of fraud or errors, corresponds with the mobile number of the mobile phone on which the software application is installed.

The routine comprises subsequently a step of automated transmission of a code, for example a one-time-password for example transmitted with a flash SMS, that the subject 105, always through the software application, will have to reintroduce on the software application; this one-time-password represents:

for the system 1, a reference code, which for a future check is at least temporarily stored within the system 1 itself;

for the software application, or equivalently for the subject 105, an authorization code for data exchange and/or the association of the electronic device 2 with the system 1.

The software application, when the subject 105 has reintroduced this code, will provide for transmitting the one-time-password again towards the system 1 in order to carry out a double check. This check comprises an electronic comparison carried out by the system 1 between the authorization code (one-time-password) transmitted by the electronic device 2 towards the system 1, and the reference code.

In a positive case (identicality), the electronic device 2 will be effectively allowed to electronically interact with the system 1, in particular by exchanging data therewith. If the subject 105 is already registered or present in databases of entities involved in the management of system 1, the mobile number given by him can be electronically compared with a preexisting mobile number, and only in case of effective identicality, to the specific software application installed on the electronic device 2 by the subject 105 the system 1 will give effective enabling. Otherwise, the system 1 will automatically send an error message towards the software application, in such a way that the subject 105 can contact a help center for confirming the correctness of the association with the mobile number.

Similarly, the system 1 can provide for a certification of the email address given by the subject 105, for example and non-limiting thereto through the transmission of a confirmation email towards the address transmitted to the system 1 from the subject 105 through the software application.

In a preferred and non-limiting embodiment, the above cited information can be introduced by the subject 105 through the software application or program installed on the electronic device 2; this software application or program presents a graphic interface which shows the private profile univocally associated to the subject 105 and preferably created as first act before the access to the system 1. The software application or program 200 allows the user to introduce access credentials which are, preferably immediately after the introduction, transmitted towards the system 1; if these credentials match with the ones of a private profile previously stored in the system 1, a logical channel is established between the electronic device 2 and the system 1.

On the electronic device 2 there are electronic data, indicated with the numerical reference 20, which are of a first specific type; in particular, the first type of electronic data comprises payment data and/or deadlines for consumers, products and services of the subject 105. These data are defined as of a "first type" because they are data which generate the execution of a payment within a predetermined moment. The software application or program 200 is conceived for having electronic access to at least part of said electronic data of said first type. The arrow 1B of FIG. 1 indicates the exchange of data between the electronic device 2 and the system 1.

The Applicant observes that the identity data previously indicated are electronic data of a second type, different from the first type. In particular, the data of the first type are electronic data which for their nature are susceptible of causing, in particular in a second time, an electronic payment through the system 1 herein described.

In particular, as schematically indicated in FIG. 1, on the electronic device 2 there are data related to emails and calendar deadlines. These data can be data of the above-mentioned first type of data.

The use of an electronic device 2 with therein installed a software program or application must not be intended as limiting, the Applicant has in fact conceived the present distributed computing environment as macro-system alternatively, or in combination, provided with means of proposition of an interface, in particular of a remote interface, in the form of web portal 200', in particular in the form of a web portal remotely accessible by a subject through for example and non-limiting thereto the Internet web, which allow the subject 105 to use at least part of the services offered by the computing environment with a web-based interface, even without need for installing the application 200 on its own electronic device 2.

The remote interface 200', as the software program or application 200, is basically configured at least for:
- allowing a selective access of the subject 105 to a private profile, optionally wherein in said private profile is present said preference electronic profile of the subject 102e, and/or
- transmitting the data of said first type of data 20 towards the system 1 and/or towards the electronic device 2,
- selectively receiving at least part of the proposal actions of purchase of products and/or services through electronic payment and with the aid of the system 1 herein described, wherein the proposal actions, which will be better described in the following portion of the description, are selectively destined to the subject 105.

In a preferred and non-limiting embodiment, the web interface 200' and/or the software application 200 previously described present firstly a login interface through which the subject 105 inserts access credentials. The system 1 provides for checking if the access credentials are correct and after it provides for showing an initial screen with which the subject 105 can select at least one, preferably a plurality and preferably all of the following functions:
- a home and/or dashboard function, with which the subject 105 can check the useful information for the use of a previously requested personalized service and/or while in the step of execution, such as for example and in a non-limiting extent a link to a voucher of a booked hotel, a reminder for a booking of a restaurant, a link to a chat related to a service in progress;
- a function of concierge activation, with which the subject 105 activates the voice communication previously described;
- a function of management of movements, with which the subject 105 reports the list of money movements carried out with the means of payment previously described;
- a function of management of carried out services, which indicates a list of services requested with a related status, and through which the subject 105 can view, among other things, the related chat and documents produced;
- a function of access to account data, through which the subject 105 can view his account data, to terms and conditions of use and consents provided and through which, optionally, the subject 105 can unsubscribe from the offered service;
- a function of access to preferences and/or profiling data.

The Applicant observes that in the home and/or dashboard function the subject 105 can optionally, but preferably, find a list of personalized services already requested and/or opened, and can—for example and non-limiting thereto through a click action—select a predetermined service and access the related chat.

The system 1 is also operatively connected with a third system 3, which for example and in anon-limiting extent is a cloud system which stores (bidirectional arrow B) and/or executes an automatic backup (arrow 1C) of electronic data of the subject 1 also present within the electronic device 2; in particular, in the third system 3 there are electronic data of said first type of data. For example, the third system 3 executes backups of at least one email account and of at least one calendar (for example and non-limiting thereto Google Calendar® or Iphone calendar) present on the electronic device 2. A non-limiting example of the third system 3 can be iCloud® of Apple®. In a particular embodiment, the logical channel that creates with the operating connection between the system 1 and the third system 3, is a safe logical channel, wherein the transmitted data are encrypted. Thanks to this aspect is not strictly necessary that the electronic device 2 is operatively available at all times, to allow the functioning of system 1: in fact, the latter can access to the third system 3 to receive the electronic data of interest (for example emails and/or calendar data) after an electronic authorization to proceed in this way received from the electronic device 2 through the software program or application 200.

The third system 3, precisely for this reason, in an embodiment can also be operatively connected by direct route with the electronic device 2. Arrow B identifies the connection operatively established between the system 1 and the third system 3 and the arrow 1A identifies the connection operatively established between the electronic device 2 and the system 1, by means of the software application 200.

Structure of the System

Figure 2:
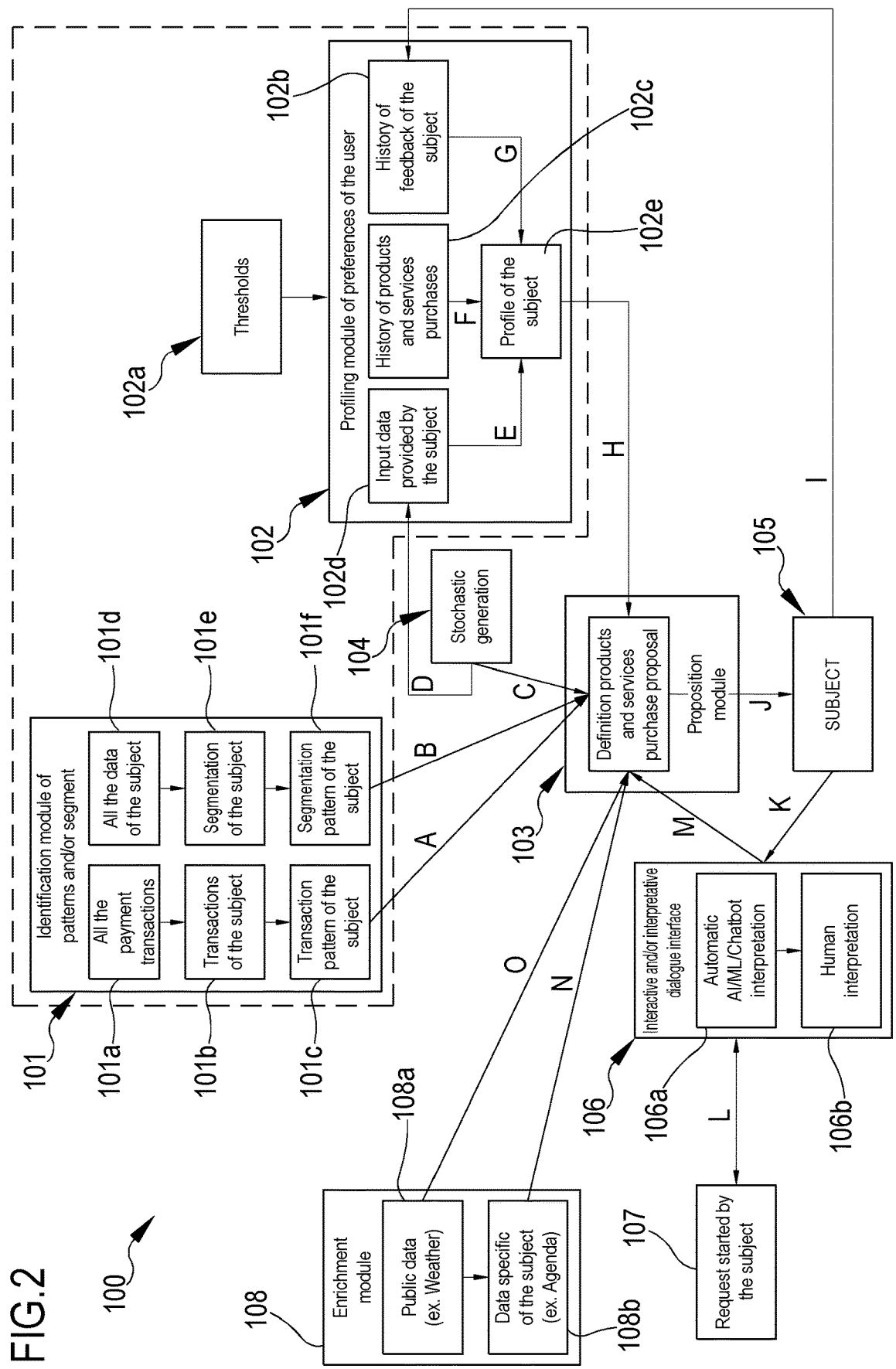
FIG. 2 shows a block diagram representing the functioning of a data processing engine in a step of automation of purchase proposals of goods and/or services towards a determined subject.
Figure 3:
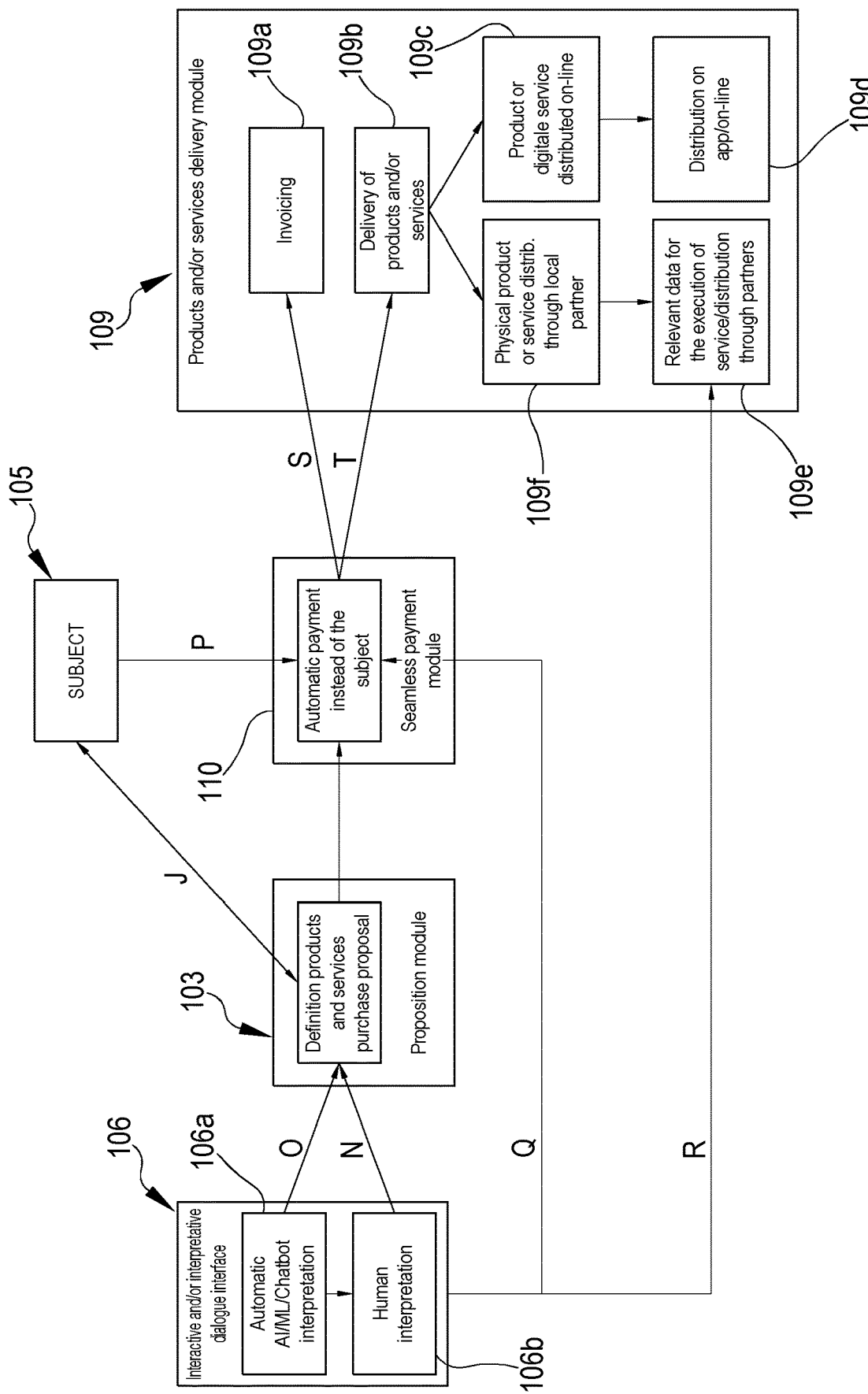
FIG. 3 shows a block diagram representing the functioning of a data processing engine in a step of payment automation and of distribution of electronically purchased products and/or services.

The system 1 allows to manage two main macro activities defined through an its own logical structure, i.e.: an automation of purchase proposals of goods and/or services (diagram of FIG. 2) and an automation of the execution of payments and of distribution of products and services previously electronically purchased through the system 1 (diagram of FIG. 3).

In particular, the purchase proposition of products and/or services is destined to generate highly customized purchase proposals of products and/or services, with the precise purpose of anticipating the needs of the client (according to the principle of "propose before the client asks"). The automation of the execution of payments and of distribution of products and services previously electronically purchased executes, when the subject 105 approves it, in an at least partially automatic way the payment in its place, and automatically causes the distribution of purchased products and/or services based on the preferences of the subject 105.

The system 1 comprises, from the logical and/or structural point of view a data processing engine identified with numerical reference 100. Operatively, the system 1 includes at least a data processing unit that is configured and has sufficient data processing capability to execute the operations described below.

In a preferred embodiment, the system 1 is a distributed computing environment, i.e. its data processing power is not concentrated in a single physical device, on the contrary, this data processing power can be distributed over geographically distinct areas.

In the present description reference will be made to modules, submodules and routine, which in the attached figures are represented as blocks separated among them and joined by connection arrows suitable for determining a logical flow of data and/or operations. These modules and submodules however shall not be necessarily intended as hardware modules and submodules; they can in fact be equivalently replaced by software modules, submodules. Also when the system 1 is physically unified, there can be more data processing units suitable for representing in a hardware and/or software way the modules and submodules herein described.

Figure 4:
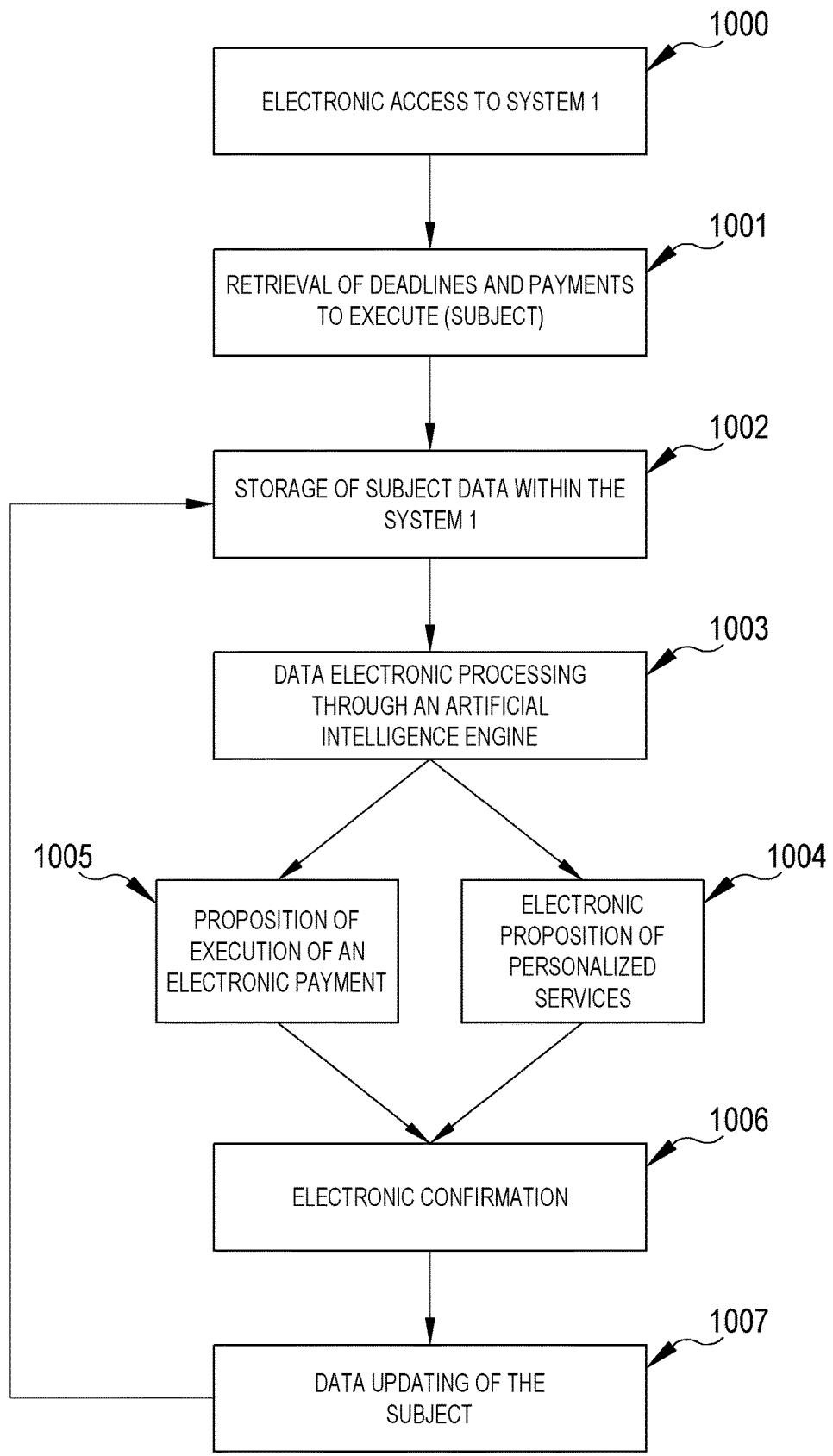
FIG. 4 shows a short block diagram of an operating process executed through the system object of the present disclosure.

The data processing engine 100 is configured for carrying out an electronic data processing (identified in FIG. 4 with the block identified by the reference number 1003) carried out on at least part of the first type of electronic data 20 stored in the system and carried out after the retrieval (block 1001) of at least a first type of electronic data 20, and for carrying out a generation, at least partially automated, of at least one of the following proposal actions:
- a transmission, towards the electronic device 2, of an electronic proposition 1004 of purchase services personalized for the subject, said electronic proposition 1004 occurring through an electronic transmission towards the electronic device 2 operatively associated to the subject;
- a transmission, towards the electronic device 2, of a proposition of a personalized electronic payment request 1005 of a predetermined amount, determined basing on said first type of electronic data 20 and/or basing on the processing carried out by the data processing engine 100.

In detail, the above-mentioned proposal actions 1004, 1005 are based at least on at least part of said first type of electronic data 20 stored in the system 1 and/or on at least a preceding proposal action 1004, 1005 previously electronically processed through said data processing engine 100.

The proposition of proposal actions 1004, 1005 is carried out, in particular, by a proposition module 103, which is configured for input gathering and collecting the data retrieved from the various remaining modules of the data processing engine 100 (these remaining modules will be better described in the following portion of description) to facilitate the physical transmission of the due proposal action 1004, 1005 towards the subject, indicated by the numerical reference 105 (arrow J).

Figure 6:
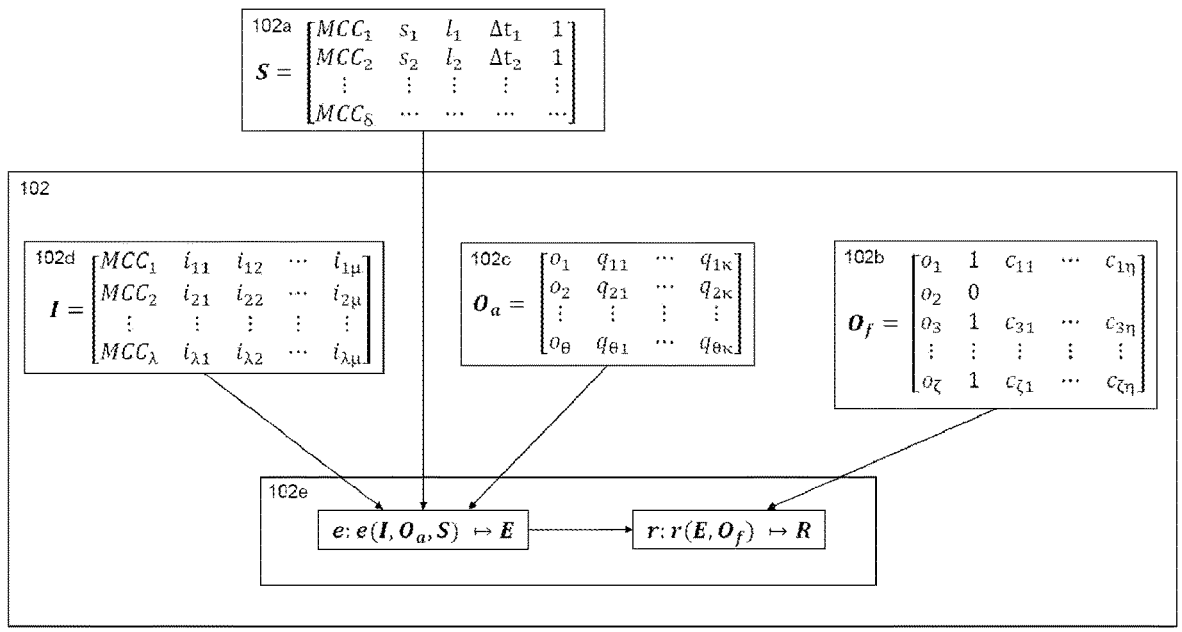
FIG. 6 shows a diagram of a profiling module of preferences of the user.
Figure 7:
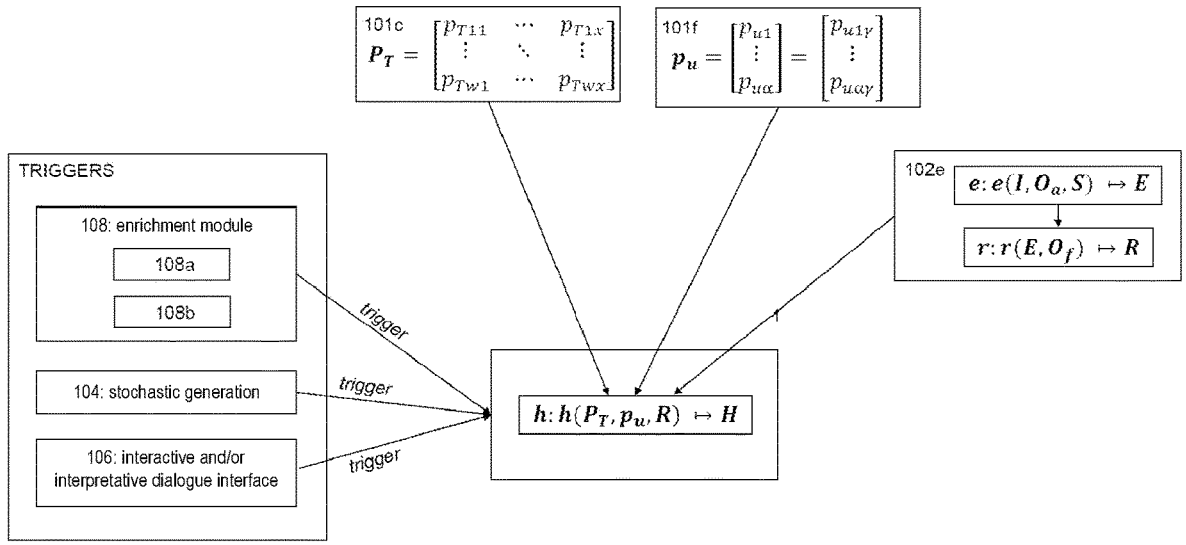
FIG. 7 shows a diagram of a proposition module.

FIG. 6 clearly summarizes the functionality and logical flows of data and electronic processing that will be described below in more detail.

In particular this proposition module 103, basing on said inputs, electronically decides which product and/or service is to be proposed to the subject 105 and at what specific time to propose it. The proposition of the product and/or service can comprise, or equivalently cause, an automated payment (without intervention of the subject 105) of a predetermined amount corresponding to the proposed product and/or service.

Figure 5:
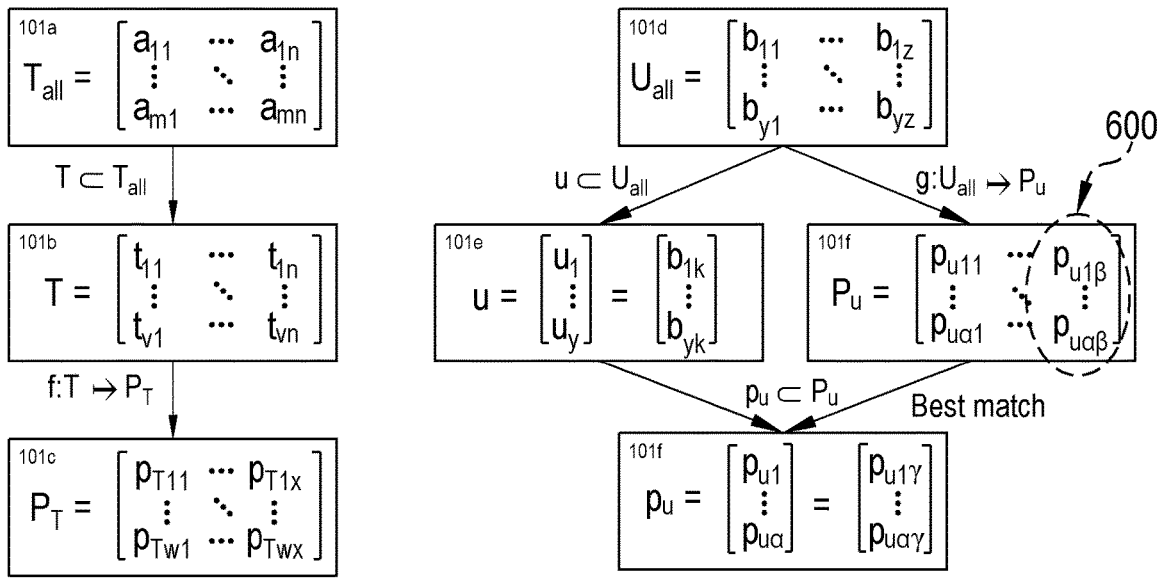
FIG. 5 shows a simplified diagram that indicates a plurality of matrices and vectors of data used by the system here described for providing personalized propositions.

From a structural point of view, the data processing engine 100 firstly comprises a profiling module, indicated by the dashed box in FIG. 2, which in turn comprises an identification module of patterns and/or segments 101 and a profiling module of preferences of the subject 102. FIG. 5 clearly summarizes the functionalities and logical flows of data and electronic processing, which will be more precisely described below with reference to the profiling module of preferences of the subject.

The profiling module is configured for carrying out an electronic modelling of a subject finalized to define an electronic model of behaviour for said subject 105.

In particular, the electronic model of behaviour of the subject is based on at least part of the data 20 retrieved in the step of retrieval (block 1001) and/or basing on one or more actions of electronic confirmation of the electronic proposition (block 1004) of personalized purchase services for the subject and/or of the proposition of an electronic payment request (block 1005), wherein said electronic confirmation is carried out by the subject through its own electronic device 2.

Referring back to the identification module of patterns and/or segments 101, this module is configured for using segments and/or patterns of a specific subject, constantly redefined, to categorize the subject 105 and predict, with a hopefully increasing precision as the subject 105 carries out—through the system 1—economic transactions (electronic payments) which may be the next subsequent transaction, i.e., which may be the next good and/or service that the subject 105 is next to purchase and where, and when, that purchase will be made.

The identification module of patterns and/or segments 101 is therefore configured at least for electronically defining a plurality of segments 101e of behaviour of subjects.

The segments 101e define and/or categorize levels of electronic payment and/or type of products or services purchased through electronic payment, in particular, then, through a process of electronic assignment, for each electronic transaction carried out through the system 1 herein described, of a determined code or categorization tag, in other terms the segments 101e define and/or categorize the so-called "spending behaviour" of the subject 105, in particular in terms of classification of expense average amount and/or in terms of expense average typology.

In a particular embodiment, the segments 101e categorize the electronic transactions at least according to a specific merchant category and/or according to a Merchant Category Code (MCC). This imposes that for each electronic payment carried out through the system 1, it is assigned a unique electronic code indicating the Merchant Category Code (MCC). The expense average typology is then associated to the merchant category previously noted, and/or to the Merchant Category Code.

The Applicant notes in particular that if more Merchant Category Codes are present for an electronic transaction, the above mentioned categorization can occur according to more Merchant Category Codes, and/or—equivalently—in according to more specific merchant categories.

The Merchant Category Code (MCC) is a numerical code—typically in four digits—according to the ISO 18245 standard that is used for financial services and is used to classify a business according to the typology of products and/or services provided. The MCC code can be assigned by typology of product and/or service (for example, hotels or sale of pharmaceuticals) or by vendor name (this case is typically reserved for large companies) and is assigned to a vendor typically by a credit card issuing company.

In a further and particular embodiment, the system 1, in particular the data processing engine, can be configured for carrying out a process comprising a step of electronic extrapolation of a particular typology of products and/or services previously purchased through an electronic payment. For example this step of electronic extrapolation can lead to the detection of a specific type of ticket, for example flight or train ticket. Preferably, but non-limiting thereto, the step of electronic extrapolation comprises an analysis of the Merchant Category Code and/or of the vendor name, for obtaining additional electronic information inherent to details of the typology of products or services. In other words, the system 1, in particular through the data processing engine, and more in particular with the identification module of patterns and/or segments 101, is configured for carrying out a categorization of the expense average typology on more levels (each comprising a particular numerosity of options) nested among them, and the assignment of a predefined electronic payment to one of said levels and/or options is based on the analysis of the Merchant Category Code and/or on additional electronic extrapolations carried out starting from said Merchant Category Code.

The levels thus represent an increasingly finer granularity (vertical scale) of segmentation, whereas options represent alternatives (horizontal level) of a same granularity. This aids to achieve a precise segmentation of expense typologies and contributes to the optimization of the processing capabilities of the identification module of patterns and/or segments.

Through the identification module of patterns and/or segments 101 it is assigned at least a segment of said plurality of segments 101e to the electronic model of behaviour of the subject or, equivalently, through the identification module of patterns and/or segments 101, it is possible to logically associate (block 101f) the electronic model of behaviour of said subject with a specific segment of the plurality of segments 101e.

From the operating point of view, the identification module of patterns and/or segments 101 processes the definition of the plurality of segments 101e starting from a collection of all the electronic data of the first type. This collection is schematically indicated with the block 101d.

For the collection 101d of all the electronic data of the first type, the system 1 herein described uses a matrix $U_{all}$ of size y×z which comprises the profile data of all the subjects.

$$U_{all} = \begin{bmatrix} b_{11} & \ldots & b_{1z} \\ \vdots & \ddots & \vdots \\ b_{y1} & \ldots & b_{yz} \end{bmatrix}$$

In the matrix $U_{all}$, each row of the y rows represents a single data or a single characteristic, and each column of the z columns represents the profile of a specific subject. In other terms:

y is the number of characteristics for each profile, and z is the number of subjects.

For example, the single characteristic can comprise: age, country of residence, risk profile, credit limit, . . . .

A simplified example of matrix $U_{all}$ can be the following:

$$U_{all} = \begin{bmatrix} 32 \text{ years} & 46 \text{ years} & 78 \text{ years} \\ \text{unmarried} & \text{married} & \text{married} \\ \text{Bellinzona} & \text{Lugano} & \text{Locarno} \\ \text{risk cat. 1} & \text{risk cat. 3} & \text{risk cat. 12} \\ \text{lim. 2'000 } CHF & \text{lim. 5'000 } CHF & \text{lim. 20'000 } CHF \\ \vdots & \vdots & \vdots \end{bmatrix}$$

The segments are extracted in the module 101e by selecting a vector u of size m which comprises a subgroup of data related to the profile of the subject, whose choice is made basing on the characteristics that mostly influence (in terms of the effectiveness of predicting the future behaviour, and therefore of the effectiveness and precision of prediction) the transactional behaviour of the subject:

$$u \subset U_{all}$$

$$u = \begin{bmatrix} u_1 \\ \vdots \\ u_y \end{bmatrix} = \begin{bmatrix} b_{1k} \\ \vdots \\ b_{yk} \end{bmatrix}$$

In the vector, m represents the total number of characteristics chosen for profiling the subject and k is the specific column of the matrix $U_{all}$ which represents the subject in question.

An example of vector u, can be the following:

$$u = \begin{bmatrix} 46 \text{ years} \\ \text{married} \\ \text{Lugano} \\ \text{risk cat. 3} \\ \text{lim. 5'000 } CHF \\ \vdots \end{bmatrix}$$

The logical association carried out by the module 101f is the one herein below indicated.

The identification module of patterns and/or segments 101 is also configured for electronically defining a plurality of patterns associated to products and/or services purchased through electronic payment.

The patterns define geographical locations associated, and/or times associated, to products and/or services purchased through an electronic payment, and through the identification module of patterns and/or segments 101 is thus possible to assign at least a pattern of the plurality of patterns to the electronic model of behaviour of said subject and/or to logically associate the electronic model of behaviour of the subject with a specific pattern of the plurality of patterns. The patterns define and/or categorize the "spending behaviour" of the subject 105 in terms of times and places of execution of an electronic payment.

By analyzing the specific transactions of the client and the related parameters, an attribution of segments increasingly more specific can be carried out as the subject 105 carries out electronic payments through the system 1 herein described, with an increasingly finer granularity and an increasingly higher consequent precision in the prediction of the possible behaviour of the subject 105.

In a non-limiting embodiment, the profiling module 101, 102, and in particular the identification module of patterns and/or segments 101 integrates, or is connected with, an artificial intelligence and/or machine learning engine configured for defining and/or attributing patterns and/or segments.

For extrapolating the patterns of segmentation, i.e. the transactional profile, of the subjects, the module 101f (pattern of segmentation of the subject, or electronic matching module) electronically applies a function of unsupervised learning which takes into account a plurality of parameters, for example geographical, demographical, behavioural (in particular, but non-limiting thereto, preferred merchants and MCC) and psychological/economical (in particular, but non-limiting thereto, average amount of purchases) parameters.

This function g comprises at least a clustering algorithm. In an embodiment, this clustering algorithm comprises at least one between a K-means algorithm and a DBSCAN algorithm (Density-Based Spatial Clustering of Applications with Noise).

$$g = \begin{cases} K\text{-means clustering} \\ \text{Density-Based Spatial Clustering of Applications with Noise} \\ \cdots \end{cases}$$

The Applicant observes in particular that the above-mentioned examples of clustering algorithms are provided only with an exemplificative purpose and shall not be intended for this reason as limiting.

In other terms, the mathematical function that is applied by the module 101*f* is the following:

$$g: U_{all} \mapsto P_u$$

$P_u$ is the matrix deriving from the function g, of size $\alpha \times \beta$, which collects all the patterns/clusters identified to the level of segmentation of the subjects, by listing the characteristics, for example average age, expense average amounts, $$P_u = \begin{bmatrix} p_{u11} & \cdots & p_{u1\beta} \\ \vdots & \ddots & \vdots \\ p_{u\alpha 1} & \cdots & p_{u\alpha\beta} \end{bmatrix}$$

In the matrix $P_u$ $\alpha$ represents the number of characteristics for each pattern and $\beta$ represents the number of detected patterns. It is observed, in particular, that in the matrix $P_u$ there is a hierarchization with respect to the first row of each column, i.e. with respect to the characteristics $p_{u11} \cdots p_{u1\beta}$.

A simplified example of the matrix $P_u$ can be the following:

$$P_u = \begin{bmatrix} \text{average age 22.7 years} & \text{average age 33.2 years} & \text{average age 41.3 years} \\ MCC = 401 & MCC = 401 & MCC = 102 \\ \text{average exp. 8.75 } CHF & \text{average exp. 11.65 } CHF & \text{average exp. 102.75 } CHF \\ \text{Lugano} \pm 5 \text{ km} & \text{Lugano} \pm 35 \text{ km} & \text{Bellinzona} \pm 12 \text{ km} \\ \text{each 2.2 days} & \text{each 5.7 days} & \text{each 4.3 days} \\ \vdots & \vdots & \vdots \end{bmatrix}$$

In the exemplificative matrix shown above, the clustering algorithms have been used for clustering 3 patterns, and the characteristic of greater hierarchical categorization is, in this case, the average age of the subject. Therefore a first cluster detected by the algorithm is the one of subjects the average age thereof is 22.7, who on average spend on products and/or services with MCC 401, spending on average 8.75 CHF, on Lugano, with a range of ±5 km each 2.2 days.

The module 101*f* (pattern of segmentation of the subject, or module of electronic matching) thus an electronic matching, wherein each subject is electronically matched to the profile that mostly corresponds to it, in mathematical terms $$p_u \subset P_u$$

$$p_u = \begin{bmatrix} p_{u1} \\ \vdots \\ p_{u\alpha} \end{bmatrix} = \begin{bmatrix} p_{u1\gamma} \\ \vdots \\ p_{u\alpha\gamma} \end{bmatrix}$$

wherein $\alpha$ represents the number of characteristics chosen for the profiling of the subject and $\gamma$ is the specific column of the matrix $P_u$ which represents the segment/cluster of the subject in question.

For example:

$$p_u = \begin{bmatrix} av. \text{ age 33.2. years} \\ MCC = 401 \\ \text{average exp. 11.65 } CHF \\ \text{Lugano} \pm 35 \text{ km} \\ \text{each 5.7 days} \\ \vdots \end{bmatrix}$$

The matrix $P_u$ can thus be considered a matrix (thus, a group) of clustered electronic data. A cluster is represented by a column of the matrix, and in FIG. it is indicated with the reference number 600.

The vector $p_u$ represents a subgroup of the matrix, and therefore comprises a cluster of data ($p_{u1}$, $p_{u\alpha}$) identifying a predetermined class of subjects to which the subject 105 is electronically matched with a criterion of maximum likelihood. The matrix $P_u$ represents, therefore, the group of profiles of the subjects.

In particular, therefore, it can be asserted that the group of clustered electronic data represented by the matrix $P_u$ comprises a plurality of clusters ($pu_{11}$-$pu_{\alpha 1}$, . . . , $pu_{1\beta}$-$p_{\alpha\beta}$) identifying respective classes of the subject, wherein, in particular, each class contains personal data of the subject and/or data related to a merchant category used on average and/or merchant category code (MCC) used on average for electronic purchases and/or place and/or time data to which electronic purchases are referred.

From the structural point of view, the plurality of expense patterns is defined from a collection of all the electronic payment transactions carried out through the system 1 described herein (block 101*a*), from which a subgroup of transactions for each subject is derived (block 101*b*).

The identification module of patterns and/or segments 101 in fact uses, in block 101*a*, a matrix $T_{all}$ of size m×n which comprises the entire history of payment transactions carried out through the system 1.

$$T_{all} = \begin{bmatrix} a_{11} & \cdots & a_{1n} \\ \vdots & \ddots & \vdots \\ a_{m1} & \cdots & a_{mn} \end{bmatrix}$$

In the matrix $T_{all}$, each row of the m rows represents a single transaction and each column of the n columns represents a specific characteristic of the transactions. In other words:

m indicates the transaction number, and n indicates the number of characteristics of a transaction.

For example, a characteristic of transactions can be date, time, amount, Merchant Category Code (MCC), . . . .

An example of matrix $T_{all}$ can be the following:

$$T_{all} = \begin{bmatrix} \text{Subject 1} & 01.01.2022 & 10{:}45 & \text{Bar Angolo} & \text{Pregassona} & MCC=401 & 2.30\ CHF \\ \text{Subject 2} & 01.01.2022 & 10{:}46 & \text{Migros} & \text{Lugano} & MCC=102 & 56.30\ CHF \\ \vdots & \vdots & \vdots & \vdots & \vdots & \vdots & \vdots \\ \text{Subject 1} & 02.01.2022 & 09.30 & \text{Coop} & \text{Canobbio} & MCC=102 & 158.76\ CHF \end{bmatrix}$$

In the embodiment identified in question, in the matrix $T_{all}$ the hierarchical organization of data is given according to the specific subject 150 (priority parameter), to which a plurality of secondary parameters is associated (in the above example, six secondary parameters).

The derivation of a subgroup of the abovementioned transactions, carried out by the module 101b, is carried out by means of a matrix T of size v×n, which comprises a subgroup of the transactions carried out by a single client (for example, the "client 1"), wherein each row of the v rows represents a single transaction and each column of the n columns represents a specific characteristic of the transactions. In other words:

v indicates the transaction number, and n indicates the number of characteristics of a transaction.

It is clear that the number of rows of the matrix $T_{all}$ increases as the system 1 is used, and this allows to improve the prediction of the possible intentions of a subject, optimizing then the precision of proposition, which becomes increasingly adapted to the specific needs of the subjects.

In an embodiment, the system 1 can be configured for deleting transactions older than a determined date, with the purpose of limiting the size of the matrix $T_{all}$ and/or with the purpose of discarding transactions older than a determined date, which for the subject's current interests may no longer be current or applicable (changed interests).

For example, a characteristic of transactions can be date, hour, amount, Merchant Category Code (MCC), . . . .

$$T \subset T_{all}$$

$$T = \begin{bmatrix} t_{11} & \cdots & t_{1n} \\ \vdots & \ddots & \vdots \\ t_{v1} & \cdots & t_{vn} \end{bmatrix}$$

An example of matrix T can be the following:

$$T = \begin{bmatrix} \text{Client 1} & 01.01.2022 & 10{:}45 & \text{Bar Angolo} & \text{Pregassona} & MCC=401 & 2.30\ CHF \\ \vdots & \vdots & \vdots & \vdots & \vdots & \vdots & \vdots \end{bmatrix}$$

Through a matching algorithm (identified by the block 101c) with for example vendors, expense category, places and hours, said patterns are finally derived. The matching algorithm identified by the block 101c (matching module) in particular extrapolates the patterns of transactions of the subject by applying a function of multivariate time series analysis (MTS, Multivariate Time Series analysis), which takes into account trends (in particular increase or decrease) over the long term, seasonality (for example, daily, monthly, or with specific frequency), cyclicality and random instability.

In particular, the function $f$ of time series analysis is preferably a function $f$ of multivariate time series analysis. In a non-limiting embodiment, this function $f$ comprises at least one among the functions of the following list: ARIMA (Autoregressive Integrated Moving Average), XGBoost (Xtreme Gradient Boosting), LSTM (Long-Short Term Memory).

In mathematical terms:

$$f = \begin{cases} \text{Autoregressive Integrated Moving Average } (ARIMA) \\ \quad \text{Xtreme Gradient Boosting } (XGBoost) \\ \quad \text{Long-Short Term Memory } (LSTM) \\ \quad \cdots \end{cases}$$

Additional functions $f$ of time series analysis, in particular of multivariate time series, of future development may conveniently be used without limitations.

From the application of the function $f$ on the matrix T a matrix $P_T$ is obtained. Pr is the matrix resulting from the function $f$, of size w×x, which collects all the patterns detected at the transactional level, defining them according to a specific parameter (for example Merchant Category Code, MCC) and listing their characteristics (for example cyclicality, average amounts, country of the merchant).

$$P_T = \begin{bmatrix} p_{T11} & \cdots & p_{T1x} \\ \vdots & \ddots & \vdots \\ p_{Tw1} & \cdots & p_{Twx} \end{bmatrix}$$

In the matrix $P_T$ w is the number of patterns detected, and x is the number of characteristics for each pattern. An example of matrix $P_T$ can be the following:

$$P_T = \begin{bmatrix} MCC=401 & 13\text{ minutes} & \textit{Pregasssona} & 2.30CHF \\ MCC=401 & 2\text{ minutes} & \textit{Lugano} & 4.25CHF \\ MCC=401 & 12\text{ seconds} & \textit{Zurigo} & 7.30CHF \\ MCC=102 & 7\text{ minutes} & \textit{Lugano} & 85.25CHF \\ \vdots & \vdots & \vdots & \vdots \end{bmatrix}$$

In the above-mentioned example matrix, the characteristics of a specific parameter (in this case, MCC) are the following: cyclicality, transaction place, amount paid.

The arrows A and B, respectively, indicate an action of transmission of patterns and segments, or of the association of the above electronic model with patterns and segments towards the proposition module 103.

The profiling module 101, 102 comprises also a profiling module of preferences of the user 102. This profiling module of preferences of the user 102 is configured for electronically processing electronic data transmitted by the subject (block 102d) through its own electronic device 2 and/or for processing previous electronic purchases (block 102c) of products or services and/or for electronically processing feedback data of the subject (block 102b and arrow I). More precisely, this module defines the profile of the subject 105 and its preferences basing on the input data provided by the subject 105 itself. The definition of the profile of the subject is the more accurate the greater the use of the system 1.

In the module of feedback data processing of subject 102b, a matrix $O_f$ of size $\zeta \times \eta$ is used, which comprises the history of feedback that a specific subject provides regarding the purchase proposals expressed by the module 103.

In the matrix $O_f$, each row represents a single offer, and each column a specific characteristic of the feedback, for example accepted or declined offer (1 or 0, second column) and rating of services (columns $c_{1\ldots\eta}$):

$$O_f = \begin{bmatrix} o_1 & 1 & c_{11} & \cdots & c_{1\eta} \\ o_2 & 0 & & & \\ o_3 & 1 & c_{31} & \cdots & c_{3\eta} \\ \vdots & \vdots & \vdots & \vdots & \vdots \\ o_\zeta & 1 & c_{\zeta 1} & \cdots & c_{\zeta\eta} \end{bmatrix}$$

The ratings of services are electronic ratings provided by the subject in relation to proposals made and/or services actually used after the approval of proposals.

In a preferred, but non-limiting embodiment:

the third column ($c_{11}$-$c_{\zeta 1}$) comprises a first parameter indicative of a global electronic assessment of the offer provided by the subject;

the fourth column comprises a second parameter indicative of an electronic assessment provided by the subject regarding a quality/price ratio of the offer;

the fifth column comprises a third parameter indicative of an electronic assessment provided by the subject regarding the timing with which the offer was proposed, in relation to the actual need of the subject;

the sixth column (for example, $c_{1\eta}$-$c_{\zeta\eta}$) comprises an additional parameter indicative of a global quality of the service used, and—for each line—contains a data only if the subject has previously accepted the offer.

From this matrix, the block 102c, which represents a module of identification of accepted purchase proposals, electronically filters the matrix $O_f$ determining the obtaining of a matrix $O_a$ of size $\theta \times k$.

The matrix $O_a$ is a subgroup of the purchase proposals expressed by the module 103 comprising the history of proposals accepted by the specific subject to which the matrix $O_f$ refers and includes only parameters related to each transaction ($q_{1\ldots\kappa}$), for example date, hour, MCC, amount, place, . . . :

$$O_a = \begin{bmatrix} o_1 & q_{11} & \cdots & q_{1\kappa} \\ o_2 & q_{21} & \cdots & q_{2\kappa} \\ \vdots & \vdots & \vdots & \vdots \\ o_\theta & q_{\theta 1} & \cdots & q_{\theta\kappa} \end{bmatrix}$$

A non-limiting example of the matrix $O_a$ is the following:

$$O_a = \begin{bmatrix} \text{American Airlines} & 200 CHF & 24.11.2019 & Chicago \\ 21C \text{ Museum Hotel} & 185 CHF & 24.11.2019 & Chicago \\ \text{Art Museum} & 35 CHF & 26.11.2019 & Milwaukee \\ \text{Taxi} & 135 CHF & 5.12.2019 & Zurich \end{bmatrix}$$

It is observed that for the purposes of the present disclosure the matrix $O_a$ represents a subgroup of the matrix $O_f$, intended as such since the number of rows of the matrix $O_a$ cannot be higher than the number of rows of the matrix $O_f$, being $O_a$ a sub-selection of only accepted offers (at most then the rows of the matrix of $O_a$ could be numerically equal to the number of rows of the matrix $O_f$). However, the matrix $O_a$ is an enriched subgroup, because unlike the matrix $O_f$, contains a plurality of parameters (on the various columns) related to the various transactions. These parameters, in the above mentioned non-limiting example, comprise amount, date of transaction and place or target of the transaction itself.

In a preferred and non-limiting embodiment, the profiling module of preferences of the user 102 can be configured for attributing different weights to electronic data transmitted by the subject (block 102d) through its own electronic device 2 and/or to data related to previous electronic purchases (block 102c) of products or services and/or to feedback data of the subject (block 102b and arrow I). In a particular embodiment, these weights are of adaptive type and/or time-variant.

In order to do so, the profiling module of preferences of the user 102 contains a module of collection of preferences 102d, upon which are loaded and temporarily stored the preferences provided by the subject in input to the system. This module of collection of preferences 102d uses a matrix I of size $\lambda \times \mu$ which collects all the data of input of the subject on its preferences related to the various categories of goods and services, as maximum amounts and specific characteristics for each category, for example and non-limiting thereto:

for travels: preferred means of transportation, for hotels: preferred category.

Each input provided by the subject is codified and inserted in the matrix I:

$$I = \begin{bmatrix} MCC_1 & i_{11} & i_{12} & \cdots & i_{1\mu} \\ MCC_2 & i_{21} & i_{22} & \cdots & i_{2\mu} \\ \vdots & \vdots & \vdots & \vdots & \vdots \\ MCC_\lambda & i_{\lambda 1} & i_{\lambda 2} & \cdots & i_{\lambda\mu} \end{bmatrix}$$

where $\lambda$ represents the number of MCC for which have been collected the inputs on preferences, and $\mu$ is the number of parameters codified related to each preference.

The parameter $MCC_\lambda$ is in this case a priority parameter, which defines the hierarchy basing of which are defined the rows of the matrix I whereas for the parameters $i_{\lambda\mu}$ are defined secondary parameters.

For example, and non-limiting thereto, these input data can be provided as a reply to questions as: what are you interested in?; what is your job?; do you have a partner and/or children?; do you own a car?; did you like the hotel you stayed in last evening?.

Through these data is electronically generated a profile of the subject (block 102e). The so generated profile of the subject is electronically transmitted from the profiling module of preferences of the user 102 towards the proposition module 103; this transmission is schematically represented in FIG. 2 by the arrow H. In detail the profile of the subject (block 102e) is calculated basing on the input data provided by the subject (arrow E), of the history of products and services 102c (arrow F) and by feedback data 102b (arrow G).

A module of profiling completion 102e extrapolates the best profile of the subject, which evolves over time based on:

- the inputs provided directly by the subject;
- the feedback provided directly by the subject;
- the purchase history with related characteristics.

The module of profiling completion 102e, electronically applies two functions or, equivalently, executes two steps of data processing. In particular, the electronically applied functions are applied one after the result of the other; coherently, the two steps of data processing are sequential, and the second is executed on the result of the first data processing.

In a first step of processing, the module of profiling completion 102e electronically applies a function e basing on an evolutive computing algorithm; in an embodiment, the function e comprises at least one among a modelling algorithm of agent-based type, a modelling algorithm of evolutive type, and an optimization algorithm of particle swarm type.

$$e = \begin{cases} \text{Agent-based modeling} \\ \text{Evolutionary algorithm} \\ \text{Particle swarm optimization} \end{cases}$$

It is intended that the function e based on an evolutive computing algorithm shall not be intended in a limiting way; other evolutive computing algorithms, different with respect to the above-mentioned ones until now, can conveniently be used in the module of profiling completion 102e.

The function e is preferably applied on matrices I, $O_a$, S and allows to obtain an intermediate result matrix E:

$$e : e(I, O_a, S) \mapsto E$$

E is the matrix of size $v \times \xi$ which collects the output of the function and applied on matrices I, $O_a$, S deriving respectively from the electronic processing carried out by the module of collection of preferences 102d, module of detection of accepted purchase proposals 102c and by the threshold management module 102a. According to the present disclosure, the matrix E represents then the matrix of the "sub-optimal" offers provided for a determined subject, without considering the transaction profile of the subject and/or of the profile of the subject itself, in particular, but non-limiting thereto, in terms of segmentation, of risk associated with the transaction, of spending limit, of demographic profile, etc.

In otherwords, the sub-optimal offers are provided to the subject 105 basing on theoretical preferences provided by the subject (matrix I) and on the transaction data of offers accepted in the past (matrix $O_a$) and on the thresholds defined in the matrix S.

The Applicant observes that according to the present disclosure the function e could be applied only on a part of the group of matrices formed by I, $O_a$, S.

A non-limiting example of the matrix E can be the following:

$$E = \begin{bmatrix} o_1 & 10.03.2022 & 12:00 & MCC = 101 & \text{Flight} & 200CHF & \text{Zürich} & \cdots \\ o_2 & 12.03.2022 & 22:00 & MCC = 254 & \text{Train} & 100EUR & \text{Milan} & \cdots \\ o_3 & 01.04.2022 & 06:00 & MCC = 455 & \text{Hotel} & 300USD & \text{New York} & \cdots \\ \vdots & \vdots & \vdots & \vdots & \vdots & \vdots & \vdots & \vdots \\ o_\zeta & 30.09.2022 & 12:00 & MCC = 688 & \text{Hotel} & 600EUR & \text{Rome} & \cdots \end{bmatrix}$$

Subsequently, the module of profiling completion 102e applies a function r of reinforcement learning ("reinforcement learning") on the result matrix E and on the matrix $O_f$; the function r then uses a reinforcement learning algorithm for further refining the profiling of the subject. The application of the function r of reinforcement learning allows to obtain the result matrix R which is then based on the intermediate result matrix E:

$$r : r(E, O_f) \mapsto R$$

In an embodiment, the function r of reinforcement learning comprises at least one among the following algorithms: Q-learning, DQN (Deep Q Neural network), Asynchronous Advantage Actor—Critic (A3C). Other or additional algorithms can be replaced and/or added to the ones of the previous list. The Applicant observes that other functions r of reinforcement learning of future development could be conveniently applied on the result matrix E and on the matrix $O_f$.

$$r = \begin{cases} Q\text{-learning} \\ \text{Deep } Q \text{ Neural Network } (DQN) \\ \text{Asynchronous Advantage Actor-Critic } (A3C) \\ \cdots \end{cases}$$

R is a matrix of size $\pi \times \rho$ which collects the output of the function e applied on the matrices E and $O_f$ deriving respectively from the function e and from the module of processing of feedback data of the subject 102b.

A non-limiting example of the matrix R is the following:

$$R = \begin{bmatrix} o_1 & 10.03.2022 & 12:30 & MCC = 101 & \text{Flight Business} & 225CHF & \text{Zürich Airport} & \cdots \\ o_2 & 12.03.2022 & 22:45 & MCC = 254 & \text{Train 1.class} & 125EUR & \text{Milan Bicocca} & \cdots \\ o_3 & 01.04.2022 & 06:30 & MCC = 455 & \text{Hotel 4}* & 350USD & \text{New York Brooklyn} & \cdots \\ \vdots & \vdots & \vdots & \vdots & \vdots & \vdots & \vdots & \vdots \\ o_\zeta & 30.09.2022 & 12:45 & MCC = 688 & \text{Hotel 5}* & 570EUR & \text{Rome downtown} & \cdots \end{bmatrix}$$

For the purposes of the present disclosure, the matrix R represents then the matrix of the "optimal" offers provided for a determined subject, which also takes into account what actually happened. So, structurally the matrix R is equal to E, but has optimizations that in particular are based on the feedback received from the subject 105 in terms of rating for each offer received (matrix $O_f$).

In the matrix $O_a$, the parameters $q_{11}$-$q_{\theta\kappa}$ related to the transactions carried out are extracted from one among the matrix E and, more preferably, from the matrix R and, even more preferably, from the matrix H.

In view of the above description, therefore, it seems clear the retroaction mechanism that occurs from the implementation of the method as previously described, where in general, the output data, ultimately the matrix H, are used as input for subsequent computations in order to optimize the process of learning of the characteristics of the subject in order to carry out increasingly more reliable and accurate proposals.

Figure 8:
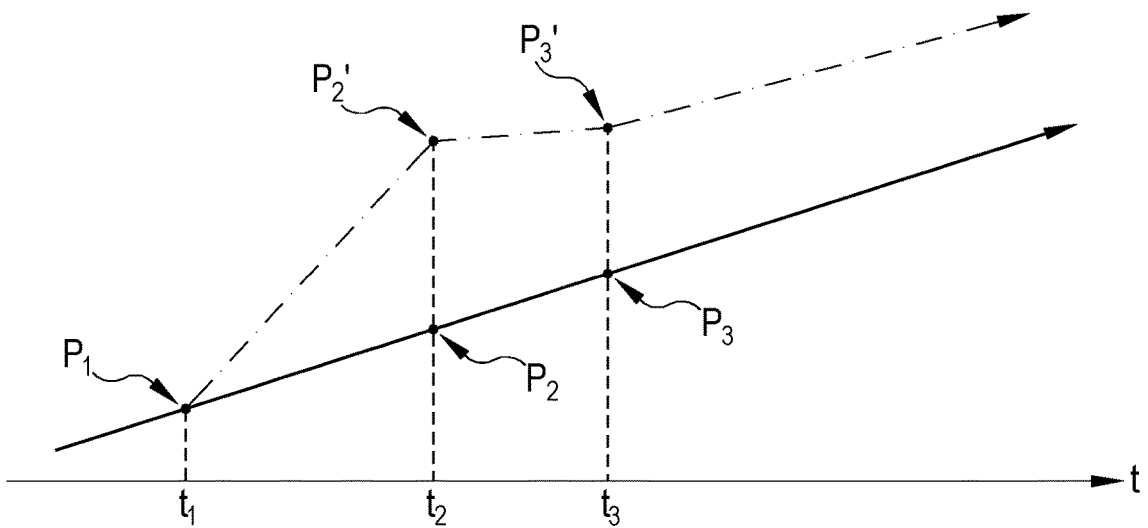
FIG. 8 shows a simplified diagram which shows a correction of the propositions carried out with an electronic reinforcement learning algorithm.

As schematically represented in FIG. 8, imagining that a time sequence of personalized propositions P1, P2, P3 at times t1, t2, t3 respectively is provided in function of the single processing step through the function e, and is aligned on a determined line that identifies a trend of personalized propositions, the use of the function r allows to customize (refine) the personalization basing on the actual feedback provided by the subject. Using the representation scheme of FIG. 8, the use of the function r allows to determine whether it makes sense to continue on the same direction already identified by the straight line or whether (points P2', P3', at times t2, t3, respectively) to further adjust the personalized proposition by varying the direction of the straight line. This allows to take into account expectations, preferences, desires that are changeable over time for any subject.

In an embodiment, the data processing engine 100 comprises also a stochastic definition module 104, that is configured for causing the stochastic definition of the proposal actions 1004, 1005, i.e. for defining the best moment to propose the above actions. In particular, the stochastic definition module 104 is configured for storing and/or defining and/or determining one or more time instants in correspondence of which carrying out the proposal actions. The stochastic definition module 104 can be also used for storing and/or defining and/or determining one or more time instants in correspondence of which carrying out the electronic payment, in particular instead of the subject 105. The arrow D in FIG. 2 indicates the operating interaction between the stochastic definition module 104 and the profiling module of preferences of the user 102. The arrow C indicates instead the operating interaction between the stochastic definition module and the proposition module 103.

The proposition module 103 defines the personalized proposals for the subject related to the purchase of goods and services (proposals of personalized services for the subject and/or requests of personalized electronic payment) by applying automatic learning methods ("machine learning"), and preferably, but non-limiting thereto, a function h of collaborative filtering ("collaborative filtering methods"). In an embodiment, the function h comprises at least one among a K Nearest Neighbors (KNN) algorithm, a matrix factorization algorithm (Matrix factorization), a deep learning algorithm, for example a Restricted Boltzmann Machines or Autoencoding algorithm.

$$h = \begin{cases} K\text{-Nearest Neighbors } (KNN) \\ \text{Matrix factorization:es. Singular Value Decomposition } (SVD) \\ \text{Deep learning:es. Restricted Boltzmann Machines } (RBMs), \text{Autoencoders} \end{cases}$$

The function h of collaborative filtering is applied on the matrix $P_T$, on the matrix R and on the vector $p_u$.

$$h:h(P_T, p_u, R) \mapsto H$$

Other functions h of collaborative filtering, also of future development, different with respect to those mentioned above as specific examples, may be conveniently applied on the matrix $P_T$, on the matrix R and on the vector $p_u$.

The matrix H which is obtained from the application of function h of collaborative filtering is the matrix of personalized service proposals and/or electronic payment requests, and is a matrix of size $\zeta \times \sigma$ that collects the output of the function h applied on the matrices $P_T$, R deriving from the matching module 101c and from the module of profiling completion 102e, and on the vector $p_u$ deriving from the module of electronic matching 101f, that summarizes in parametric format all the most relevant personalized proposal with the related characteristics.

$$H = \begin{bmatrix} h_{11} & h_{12} & h_{13} & \cdots & h_{1\sigma} \\ h_{21} & h_{22} & h_{23} & \cdots & h_{2\sigma} \\ \vdots & \vdots & \vdots & \vdots & \vdots \\ h_{\varsigma 1} & h_{\varsigma 2} & h_{\varsigma 3} & \cdots & h_{\varsigma\sigma} \end{bmatrix}$$

In the matrix H, $\sigma$ represents the number of characteristics of a proposal and S represents the total number of proposals. A simplified example of matrix H can be then the following:

$$H = \begin{bmatrix} \text{Train} & 100CHF & 3.5.2022 & 11.00 & Zurigo \\ \text{Hotel} & 800CHF & 3.5.2022 & 4 \text{ days} & Zurigo \\ \text{Airplane} & 250CHF & 7.5.2022 & 12.00 & Ginevra \\ \text{Train} & 150CHF & 7.5.2022 & 17.00 & Lugano \end{bmatrix}$$

The function h of collaborative filtering therefore also categorizes the purchase proposals, codifying this category into a parameter of the matrix H in:

always valid (and which therefore can be interesting at any time for the subject), or subject to one or more conditions (and which therefore should be submitted to the subject only when those conditions are fulfilled).

$$H = \begin{bmatrix} o_1 & \text{always valid} & 10.03.2022 & 12:45 & MCC = 101 & \text{Flight Business, } KLM & 223.10 CHF & \text{Zürich Airport} & \cdots \\ o_2 & \text{always valid} & 13.03.2022 & 00:12 & MCC = 254 & \text{Train 1.class, } Treintalia & 117.50 EUR & \text{Milan Bicocca} & \cdots \\ o_3 & \text{triggered by agenda} & 01.04.2022 & 07:00 & MCC = 455 & \text{Regency Hotel } 4* & 300.00 USD & \text{New York Brooklyn} & \cdots \\ o_4 & \text{triggered by agenda} & 01.04.2022 & 07:00 & MCC = 455 & \text{Sheraton Hotel } 4* & 370.50 USD & \text{New York Manhattan} & \cdots \\ \vdots & \vdots & \vdots & \vdots & \vdots & \vdots & \vdots & \vdots & \vdots \\ o_\zeta & \text{triggered by weather} & 02.10.2022 & 14:30 & MCC = 688 & \text{4 Seasons Hotel } 5* & 588.70 EUR & \text{Rome downtown} & \cdots \end{bmatrix}$$

In this example it is observed, in the second column, a parameter related to the temporal validity of the purchase proposals carried out. This parameter, which for the purposes of the present disclosure is to be intended as optional, allows to replicate or not one or more transactions at predetermined time intervals without the need to have further confirmations actively made by the subject, or trigger an offer towards the subject based on the triggers here described.

As it is therefore clear from the preceding description, the system here described executes a method such that the proposal actions 1004, 1005 and in particular the group H of personalized service proposals for the subject and/or of proposals of personalized electronic payment requests, are based on an electronic processing of at least part of feedback data $O_f$, E through an application of:

- a reinforcement learning algorithm r on at least part of feedback data $O_f$, E, the application of the reinforcement learning algorithm r producing an at least temporary storage of a group, optionally a matrix or vector, R of data result of the application of the reinforcement learning algorithm r on the feedback data group $O_f$, E, and, in sequence
- a collaborative filtering algorithm h applied on the result data group R and at least on a filtered transaction data group, optionally a matrix or vector, $P_T$, comprising a plurality of data of transactions (T) carried out by the subject, wherein, in the filtered transaction data group $P_T$, the data of transactions T carried out by the subject 105 are electronically filtered by means of at least an analysis function of time series, optionally an analysis function of multivariate time series ($f: T \mapsto P_T$).

Thus, it is a particular process of processing data in two subsequent, and correlated, steps, thanks to which it is possible to determine a considerable precision of supply of said proposals.

Preferably, the data processing engine comprises also a payment threshold decision module. This payment threshold decision module is configured for storing and/or determining at least a criterion of feasibility of an electronic payment, in particular of at least a maximum payment threshold.

The payment threshold decision module is configured for causing the execution of the electronic payment, without the intervention of the subject, only when the amount to be paid through the electronic payment complies with the predetermined criterion of feasibility, which in an embodiment comprises at least a maximum payment threshold. Below the maximum payment threshold, the electronic payment can be automatically carried out, above the maximum payment threshold, the electronic payment must be actively authorized by the subject 105. Generally, therefore, it can be considered that the system 1 object of the present disclosure is conceived to execute as far as possible, and preferably for more than 50% of the occurrences, automated payments, "transparent" for the subject 105, i.e., without its active interaction. Although it has been indicated that the system 1 object of the present disclosure is conceived to execute preferably said payments automated in a "transparent" way for more than 50% of occurrences, more preferably it is conceived to execute preferably at least 75% of the payments in a "transparent" automated way, and even more preferably it has been conceived to arrive at a target of at least 90% of the payments automated in a "transparent" way.

It can occur in fact the case that the subject 105 intends to make, through the system 1 object of the present disclosure, determined payments of little amount completely automated, for example because cyclical. In an embodiment, for example, the payment threshold decision module can be set with a threshold fixed at 200 CHF. In this case, monthly payments for example of telephone bills within the limit of 200 CHF can be made automatic, and thus can require not anymore interventions of the subject.

The data processing engine 100 also comprises a threshold management module, indicated with the reference number 102a.

The threshold management module 102a is configured for causing the definition of at least a proposition threshold value destined to determine or prevent the at least partially automated execution of at least one of the proposal actions 1004, 1005.

In particular, the threshold management module 102a uses a matrix S of size $\delta \times \varepsilon$ which contains the thresholds of amount defined for each MCC ($s_1, s_2, \ldots$), the maximum number of repetitions of purchase propositions in a time interval ($I_1, I_2, \ldots$), the related time interval $\Delta t$ ($\Delta t_1, \Delta t_2, \ldots$), and the indication of activation or deactivation (1 or 0), for example:

$$S = \begin{bmatrix} MCC_1 & s_1 & l_1 & \Delta t_1 & 1 \\ MCC_2 & s_2 & l_2 & \Delta t_2 & 1 \\ \vdots & \vdots & \vdots & \vdots & \vdots \\ MCC_\delta & \cdots & \cdots & \cdots & \cdots \end{bmatrix}$$

In the matrix S, $\delta$ represents the number of MCC for which it is defined a threshold and the related parameters, and $\varepsilon$ is the number of considered parameters (in the above example, $\varepsilon=5$).

In particular, the threshold value is function of, and/or is altered in function of, one or more actions of electronic confirmation of the electronic proposition 1004 of personalized purchase services for the subject and/or of proposition of an electronic payment request 1005.

In other terms, the threshold value set by the threshold management module 102a is an adaptive value. Thanks to this aspect it is possible to make the system 1 herein described extremely efficient, because capable of proposing or not determined actions according also to the variations of tastes or interests of the subject 105, arranging below the threshold or anyhow causing the under-threshold position of determined proposal actions 1004, 1005 which could be of no effective interest for the subject 105.

In an embodiment, the threshold management module 102a can be configured for computing a number of approvals of electronic propositions towards the subject 105 or, alternatively, can be configured for computing a ratio between the number of approvals of said electronic propositions and a number of electronic propositions 1004 of purchase services personalized for the subject 105, optionally for a determined segment of electronic payments.

For example, it can be considered that the system 1 generates purchase proposals for hotel room reservations. It could be possible to define for example that after 5 proposals not accepted by the client, the system 1 can stop this type of purchase proposals (at least for a certain time period, always configurable), because probably not interesting for the subject 105, even if proposals of other type (flight/train tickets, auto rental, apartments loans, restaurant reservation . . . ) can continue.

In this case, having fixed a determined electronic proposition and/or a predetermined type of electronic proposition, if the number of approvals of electronic proposals towards the subject 105 or, alternatively, the above mentioned ratio, decrease, at least for a predetermined time period, under a predetermined threshold value, the system 1 is configured for automatically switching and/or altering and/or annulling a determined, and/or a determined type of, electronic proposition towards said subject 105.

The proposals contained in the matrix Hare then submitted to the subject basing on three possible triggers.

A first trigger can be provided by an enrichment module 108. In an embodiment, in fact, the data processing engine 100 comprises also an enrichment module 108, conceived with the purpose of further refining the proposal actions 1004, 1005 towards the subject 105 through the integration of data deriving from sources external to the system 1.

The enrichment module 108 is configured then for loading auxiliary electronic data retrieved from one or more external sources 108*a*, 108*b*. The external sources indicated with numerical references 108*a*, 108*b* can be of various types and in the embodiment shown in FIG. 2 are for example and non-limiting thereto public data (block 108*a*) such as for example meteorological data or specific data of the subject (block 108*b*) for example and non-limiting thereto retrieved from the agenda of the latter.

In an embodiment, the data from public sources 108*a* comprise for example data of meteorological conditions change and/or of transit limitation between Countries given by the epidemy. In an embodiment, the data provided by specific sources of the subject 108*b* comprise data of an electronic agenda, or of an electronic schedule.

The enrichment module 108, basing on these information decides the suitable moment for proposing a certain purchase proposal using a series of predefined rules, following the logical equation that is applied on the proposals of the matrix H:

$$\{if\ condition\ x\text{=true,then propose proposal}\ h_{x1\ \ldots\ xo}\}$$

In FIG. 2 are shown the arrows N and O which bring the auxiliary data towards the proposition module 103. Alternatively, or in addition, the external sources can comprise positioning receivers, in particular and non-limiting thereto global satellite positioning receivers, in particular and non-limiting thereto GPS receivers.

In a non-limiting embodiment, the electronic data coming from the external sources are retrieved through API.

A second trigger can be provided by the stochastic definition module 104, which uses a stochastic input generation algorithm in function of time, for submitting the purchase proposals that do not follow the predefined triggering rules but are always valid and then can be proposed to the subject at any time.

A third trigger can be provided through an interactive/interpretative dialogue interface module 106, which activates on explicit request started by the subject (107). In an embodiment, in fact, the data processing engine 100 comprises also an interactive and/or interpretative dialogue interface 106, configured for causing a loading of data of said first type of data on the system 1 and/or for receiving an electronic confirmation of the electronic proposition 1004 of personalized purchase services for the subject and/or of the proposition of an electronic payment request 1005; in addition, or alternatively, the interactive and/or interpretative dialogue interface 106 can be configured for transmitting messages logically associated to the loading of data of said first type of data on the system 1 and/or to the electronic confirmation.

In the embodiment shown in the attached figures, the interactive and/or interpretative dialogue interface 106 comprises a first automated interpretation module 106*a* through an artificial intelligence and/or machine learning engine and/or chatbot and a second human interface (or interpretation) module 106*b*.

In a preferred and non-limiting embodiment, said chatbot is characterized by a process of "Natural Language Interpretation" or "Natural Language Understanding".

The interactive and/or interpretative dialogue interface 106 is operatively connected with the electronic device 2 in order to install an interactive dialogue with the subject 105 (arrow K), for example and non-limiting thereto for requesting feedback after the electronic proposition 1004 of purchase services personalized for the subject and/or of an electronic payment request 1005. Through the machine learning and a semantic engine that defines processes, flows and specific conceptual structures, the system 1 herein described is provided with a conversational system capable of evolving over time basing on new data, in particular of said first type of electronic data 20, and new information acquired thanks to the conversations with the subject 105.

In a non-limiting embodiment, the interactive and/or interpretative dialogue interface 106 is configured for processing a predefined portion, in particular and non-limiting thereto at least 75%, more preferably 80%, even more preferably 90%, of the requests of the subject 105 in an automatic way, leaving then to the second human interface module 106*b* only a maximum 25% of the processing of requests of the subject.

The interface with the electronic device 2 is thus an interface which is also capable of managing flows of voice and/or written type bidirectional data.

In the diagram of FIG. 2, the requests started by the subject 105 are indicated by the block with numerical reference 107 (arrow L).

The interactive and/or interpretative dialogue interface 106 transmits data of confirmation of requests carried out by the subject 105 towards the proposition module 103; this transmission is schematically represented by the arrow M.

The FIG. 3 shows a principle diagram of a model of automated execution of payment and deliveries of products and/or services through the system 1 object of the present disclosure.

In this diagram are first of all present in the interactive and/or interpretative dialogue interface module 106 and the proposition module 103 which comprise the same substructures or elements and are designated to execute the same above described functions. For this reason, these modules are not again described.

It is also present an electronic payment module, indicated with the numerical reference 110, which is configured for allowing, or directly allowing, the material execution of an electronic payment instead of the subject 105. With the term "instead of the subject" is intended that basing on the specific system configuration, the electronic payment module 110 relieves the subject 105 of at least part, preferably all, of the manual operations which are traditionally necessary for a subject in order to carry out said electronic payment. In other words, the electronic payment module 110 can be defined a "seamless" payment module, i.e. capable of acting—under the conditions described in the present document—instead of the subject 105.

The electronic payment module 110 receives as input at least a first input coming from the proposition module 103 and, optionally, a second input from the subject 105. The first input is transmitted from the proposition module 103 towards the electronic payment module 110 only in case of authorization of the automated payment provided for example after the approval of a proposition of an electronic payment request 1005; the second input is instead manually transmitted by the subject 105 (arrow P). This first input can comprise data of execution of an electronic payment. Preferably, but non-limiting thereto, the electronic payment module 110 receives also as input data deriving from the interactive and/or interpretative dialogue interface module 106 (this input is represented by the arrow Q).

In a preferred and non-limiting embodiment, the second input coming from the subject 105 in fact occurs through the electronic device 2 through a protected and/or authenticated communication, for example and non-limiting thereto through an authentication of biometric type.

More precisely, through the electronic payment module 110 is realized a step of electronic payment at least partially automated, which typically occurs after the step of data processing 1003 and/or after the proposition of an electronic payment request 1005 personalized for a predetermined amount. Herein the system 1, precisely through the payment module 110, electronically accesses to, and/or exchanges electronic data with, an electronic payment entity 5, optionally a bank institute and/or a bank card, optionally credit cards, management institute and/or a financial institute. The entity 5 is an entity to which the subject 105 has been previously electronically affiliated, and that therefore has the data of the subject 105 sufficient for allowing the identification thereof at the electronic contact received from the payment module 110.

A step of electronic confirmation 1006 follows the electronic payment request 1005. This step of electronic confirmation 1006 can comprise the transmission of an electronic data of confirmation of effective execution of the electronic payment; the transmission occurs from the entity 5 towards the system 1. At this point, it can occur a step of data updating of the subject 105 (block 1007) which allows the system 1 herein described to propose the purchase of products and/or services in a continuously efficient and up-to-date manner.

The entity 5 manages at least a payment card, optionally a credit card, and/or a debit card and/or a prepaid card, and/or a bank account and/or an e-wallet and/or a cryptocurrency circuit and/or a service of digital payment and of money transfer through Internet, of the subject 105.

In a particular preferred and non-limiting embodiment, the software application or program 200 installed on the electronic device 2, or alternatively the interface portal 200', are managed by the entity 5, and the system 1 represents, and acts as, a gateway between the entity 5 and the electronic device. In this way, when a proposition of an electronic payment request is started, the system 1 does not know the data of the credit card, prepaid card or debit card (or also the data of the bank account and/or of the e-wallet and/or of a cryptocurrency circuit and/or of services of digital payment and of money transfer through Internet) of the subject 105 with which carrying out the payments. With the electronic payment request can be transmitted, from the system 1 towards the entity 5, electronic data suitable for univocally identifying the subject 105 and the possibly due amount. In this way, should cyber-attacks be carried out towards the system 1, they could not cause the direct acquisition of data of bank cards of the subject 105. The Applicant observes that the above-mentioned data are too data of another type with respect to the first type of electronic data 20 previously mentioned.

In particular, the payment is made possible because together with the electronic payment request towards the entity 5, to the latter are transmitted (from the system 1 or anyhow through the system 1) data of a payment card associated and previously authorized by the subject 105; the entity 5 is in particular configured for executing the electronic payment through the above mentioned payment card associated to the subject 105 and previously authorized by the same subject for the execution of electronic payments. In particular the entity 5 executes, optionally, a step of check of authorization to use a specific payment card (or, as above described, authorization to use a specific bank account and/or an e-wallet and/or a cryptocurrency circuit and/or a service of digital payment and of money transfer through Internet), wherein it electronically and, preferably, automatically, checks if the subject 105 requesting the execution of the electronic payment is effectively authorized to request the execution of electronic payments through the electronically selected payment card. In negative case, the entity 5 can deny the execution of the electronic payment by sending an appropriate denial message towards the system 1, which will conveniently transmit it again preferably towards the electronic device 2.

A particular embodiment comprises not only the management, but more specifically the direct association between the software application or program 200 (or interface portal 200') and the entity 5. Inter alia, this involves that, when it is considered a specific electronic device 2, or equivalently a specific subject 105, exists an electronic (logical) association between the software application or program (or version of the interface portal 200' accessed by the subject 105 after the introduction and check of own access credentials) and a specific bank payment card, in particular a credit card, and/or a debit card and/or a prepaid card, and/or a specific bank account and/or a specific e-wallet and/or a specific cryptocurrency circuit and/or a specific service of digital payment and of money transfer through Internet, which ensures a considerable confidentiality of the sensitive data of payment means of the subject 105.

The step of electronic payment that the electronic payment module 110 is configured for carrying out comprises in particular an electronic selection, optionally automated, of a payment card, optionally a credit card, and/or a debit card and/or a prepaid card, and/or a bank account and/or an e-wallet and/or a cryptocurrency circuit and/or a service of digital payment and of money transfer through Internet associated, and previously authorized by, said subject 105.

As schematically shown in FIG. 3, the electronic payment activates at last a products and/or services distribution module, identified by the reference number 109.

Said products and/or services distribution module comprises in detail a first billing sub-module 109a, configured for electronically arranging an invoicing of amounts corresponding to the electronic payment executed by the electronic payment module 110. This first sub-module 109a receives, as input (arrow S) deriving from the electronic payment module 110, at least the data of the paid amount, the addressee of the amount (for example and non-limiting thereto identified through a payment card, optionally a credit card, and/or a debit card and/or a prepaid card, and/or a bank account and/or an e-wallet and/or a cryptocurrency circuit and/or a service of digital payment and of money transfer through Internet associated) and the data of the subject 105 to whom the bill should be addressed. The first sub-module 109a causes, in a non-limiting embodiment, the transmission of the electronic bill previously created towards the subject 105, in particular towards the electronic device 2 of the subject 105. In another embodiment, the first sub-module 109a transmits itself the electronic bill towards the subject 105, in particular towards the electronic device 2 of the subject 105.

The products and/or services distribution module 109 comprises also a second products and/or services distribution control sub-module 109b which is configured for controlling the distribution and the delivery of products and/or services purchased by the subject 105, in particular by electronically managing a differentiation between the digital type products and/or services distribution (block 109c) and the physical type products and/or services distribution (block 109f). The second products and/or services distribution control sub-module 109b receives as input (arrow T) at least the (physical or virtual) address data of the subject 105 to which distribute the purchased product and/or service.

In detail, in case of digital type products and/or services distribution (block 109c), such as for example and non-limiting thereto electronic travel tickets, online subscriptions, payment for software programs or applications, the second products and/or services distribution control sub-module 109b manages a routine (block 109d) of management of transmission of the digital type product and/or service towards the correct target electronic device, which in a non-limiting embodiment can be the electronic device 2 of the subject 105. According to the present disclosure, the target electronic device can be then an electronic device of the subject 105 or operatively associated to the subject 105.

Therefore, it can be asserted that the activation of the electronic payment module 110 causes an electronic arrangement of an invoicing of amounts corresponding to the electronic payment, and/or causes a control of a distribution and/or a control of a delivery of products and/or services purchased by the subject 105, and/or causes the start of a step of digital type product and/or service transmission management towards a predefined electronic device, optionally wherein said predefined electronic device is the electronic device of the subject 105 and/or is an electronic device operatively associated to the subject 105, and/or causes the start of a step of distribution addresses management towards which distributing a product and/or service purchased through said electronic payment, and/or causes the electronic alerting of a distributing partner for the distribution of a physical product towards a predetermined address, said physical product having been purchased through the electronic payment.

The physical type products and/or services distribution occurs for example and non-limiting thereto through partner companies at local level, for example and non-limiting thereto through partner companies at local level, in this case there is the need of knowing a physical address to which distributing the product or service. The second products and/or services distribution control sub-module 109b manages a routine of distribution address management (block 109e), which receives as input address data of the subject 105 to which distributing a determined product and/or service purchased through said electronic payment.

In a non-limiting embodiment, the routine indicated by block 109e receives as input data of the subject 105 through interactive and/or interpretative dialogue interface module 106 (arrow R).

When the subject 105 interfaces for the first time with the system herein described, comes in contact with a software interface configured for automatically and autonomously directing, as long as, and where it is, possible, the subject 105 in providing the correct answers to questionnaires.

In parallel and/or in addition to the software interface, the system 1 can provide for the establishment of a connection with an operator, who will provide aid to the software interface where problems are encountered or where responses to proposed questionnaires are not satisfactory. Such a connection with an operator can be an electronic connection managed through the interactive and/or interpretative dialogue interface module 106.

These questionnaires allow, for example and non-limiting thereto, to identify preferences for a concierge service, a document archive, travels, meals, hotels, and hobbies. The personal profile of the subject 105 contains at least identity data of the subject, and is associated with electronic access credentials, clearly confidential, which the subject 105 will use for future accesses to the system 1 itself.

These questionnaires are useful because they serve to complement the electronic processing carried out by the data processing engine 100 previously described. This advantageously allows to have a system 1 that although through the data processing engine 100, in particular when provided with artificial intelligence, can "learn" the preferences of the subject 105, and then become increasingly more precise, can be marked from the start by a significant accuracy in the proposition of personalized services for the subject 105, as it is "fed" from the start with correct preference data.

The information provided by the subject 105 through the above-mentioned questionnaires, or otherwise provided on a private area of the personal profile of the subject itself, are electronically processed by the system 1, and in particular by the data processing engine 100, to start an electronic profiling of the subject 105 itself. However, for the purposes of the present disclosure, it is not necessary that such information are compulsorily introduced; in fact, in a preferred and non-limiting embodiment, the system 1, in the absence of information introduced by the subject 105 on its private area, is configured for automatically starting a step of alternative initial profiling, wherein instead of the information introduced by the subject 105, the electronic profiling of the subject is electronically extrapolated from the payment documents (data of said first type of data) made accessible by the subject 105 itself.

It is observed that there are several modes with which the system 1 can acquire payment documents of the subject 105 in order to be able to start the above-mentioned personalized services and payment proposition activities. In particular, a first solution of payment documents acquisition through an email scanning procedure, carried out for example through OCR of the email itself or, alternatively or in combination, direct electronic acquisition of the information contained in the email itself. The email scanning is conveniently realized through the software application or program installed on the electronic device 2.

A second acquiring solution is realized through the interface portal 200' and involves, for example, an action of copying the payment document on a predefined area of the interface portal 200'.

A third acquisition solution is realized through the possibility of acquiring pictures through the software application or program installed on the electronic device 2. Upon the acquisition of the picture, such software application or program is configured for automatically carrying out a transmission of the acquired picture towards the system 1, so that it is the latter that executes an electronic data processing procedure, for example by means of OCR, barcode or QR code or similar, in order to acquire the salient data of the picture useful to be able to start the above-mentioned request for the execution of the electronic payment. Alternatively, for example if the computing power of the electronic device 2 so allows, the electronic processing of the picture to extract the salient data may be directly performed by means of the software application or program of the electronic device 2.

To summarize, all the three above identified solutions allow the system 1 to acquire electronic payment data manually entered by the subject 105; they are then collected (stored) in the documentary archive of the system 1.

The advantages of the object of the present disclosure are clear in light of the above description. The method and the distributed computing environment herein described identify a service model side-by-side with a highly personalized payment system, which provides suggestions and proposals personalized on the lifestyle, habits and spending ability of the subjects 105.

The distributed computing environment and the method herein described act proactively by anticipating to the subject 105 those services it needs before even asking for them by using the information gathered to propose the most appropriate schedules, events and actions.

Thanks to the deep and structured knowledge of the subject, the system automatically fulfills the payment task, while also managing the digital archive of all the related documents (bills, postal bulletins, receipts, ecc.).

The invention claimed is:

1. Method for providing purchase proposals and personalized and automated payment services to a subject, the method comprising:
   a step of electronic access to a personalized payment services provisioning system, the step of electronic access being carried out by means of an electronic device operatively associated to the subject;
   a step of retrieval of at least a first type of electronic data of said subject comprising payment data and/or deadlines and a data group (u) identifying one or more characteristics of the subject, said step of retrieval being carried out by said system after said electronic access and comprising an electronic reception of at least part of said first type of electronic data from said electronic device or from a third system;
   a step of electronic storage of at least part of said first type of electronic data within an electronic memory of said system;
   a step of data electronic processing, carried out after the step of retrieval of the at least a first type of electronic data, wherein a data processing engine processes at least part of the first type of electronic data stored within said system, said step of data electronic processing comprising a step of electronic profiling of the subject,
   said method comprising an automated generation, and by means of the data processing engine, of a matrix or vector, (H) of proposals of services personalized for the subject and/or of propositions of personalized electronic payment requests, and comprising an electronic generation and transmission to said subject of at least one of the following proposal actions:
      an electronic proposition of said services personalized for the subject, for the purchase of at least a product and/or service, said electronic proposition occurring through an electronic transmission towards the electronic device operatively associated to the subject;
      an electronic proposition of said personalized electronic payment request of a predetermined amount associated to the purchase of a product and/or service, wherein the amount is determined basing on said first type of electronic data and/or basing on the processing carried out by the data processing engine;
   said proposal actions and said matrix or vector (H) of proposals of services personalized for the subject and/or of propositions of personalized electronic payment requests being based at least on at least part of said first type of electronic data stored in the system and/or on at least a preceding proposal action previously electronically processed through said data processing engine, said proposal actions and said matrix or vector (H) of proposals of services personalized for the subject and/or of propositions of personalized electronic payment requests being based in particular on at least a group, optionally on at least one between a matrix or vector, of feedback data ($O_f$, E), comprising feedback data provided by the subject in relation to said preceding proposal action,
   said matrix or vector (H) of proposals comprising:
      at least a proposal of services personalized for the subject and/or at least a proposition of a personalized electronic payment request, and
      at least a characteristic associated to said proposal of services personalized for the subject and/or to said proposition of a personalized electronic payment request.

2. Method according to claim 1, comprising:
   a step of reception of feedback data provided by the subject in relation to said preceding proposal action,
   a step of generation, or of updating, of said group, optionally said at least one between a matrix or vector, of feedback data ($O_f$, E), after the step of reception and according to said feedback data provided by the subject,
   a step of updating of said matrix or vector (H) of proposals using the data of said group, optionally said at least one between a matrix or vector, of feedback data ($O_f$, E).

3. Method according to claim 1, wherein the generation of the matrix or vector (H) of proposals and/or the step of updating of the matrix or vector (H) of proposals comprises an electronic processing of said feedback data group ($O_f$, E) through:
   at least an artificial intelligence algorithm, in particular a reinforcement learning algorithm, and determines an at least temporary storage of a data group, optionally a matrix or vector, (R) result of the application of the artificial intelligence algorithm on the feedback data group ($O_f$, E), optionally, an electronic filtering through at least a collaborative filtering algorithm (h) applied on the result data group (R) and at least on a filtered transaction data group, optionally a matrix or vector, ($P_T$), comprising a plurality of data of transactions (T) carried out by the subject, wherein, in the filtered transaction data group ($P_T$), the data of transactions (T) carried out by the subject are electronically filtered by means of at least an analysis function of time series, optionally an analysis function of multivariate time series (f: T↦$P_T$), said group ($P_T$) of filtered transaction data comprising at least a pattern of a transaction and at least a characteristic associated to said at least a transaction pattern;

optionally wherein said collaborative filtering algorithm (h) comprises at least one among the algorithms of the following list: nearest neighbors, matrix factorization, deep learning, preferably wherein said proposal actions and said matrix or vector (H) of proposals of services personalized for the subject and/or of propositions of personalized electronic payment requests are based on an electronic processing of at least part of the feedback data (Of E) through an application of:

- a reinforcement learning algorithm (r) on said at least part of feedback data ($O_f$, E), the application of the reinforcement learning algorithm (r) producing an at least temporary storage of a data group, optionally a matrix or vector, (R) result of the application of the reinforcement learning algorithm (r) on the feedback data group ($O_f$, E), and, in sequence
- a collaborative filtering algorithm (h) applied on the result data group (R) and at least on a filtered transaction data group, optionally a matrix or vector, ($P_T$), comprising a plurality of data of transactions (T) carried out by the subject, wherein, in the filtered transaction data group ($P_T$), the data of transactions (T) carried out by the subject are electronically filtered by means of at least an analysis function of time series, optionally an analysis function of multivariate time series (f: T↦$P_T$).

4. Method according to claim 1, wherein the step of data electronic processing comprises an analysis and/or processing of the typology and/or of the segmentation of electronic payments carried out by the subject through the system, wherein the typology and/or the segmentation of electronic payments is electronically determined by applying at least a clustering algorithm (g: $U_{all}$↦$P_u$), preferably at least one between a K-means algorithm and a DBSCAN algorithm, on a group, optionally a matrix, of clustered electronic data ($P_u$), comprising said data group (u) identifying one or more characteristics of the subject and other groups of data identifying one or more characteristics of subjects different from said subject, and/or comprises an analysis and/or processing of data of specific preference of the subject, optionally directly received by the subject and/or electronically extrapolated from previous electronic payments carried out by the subject through the system, wherein said analysis and/or processing of data of specific preference of the subject comprises the processing of a group, in particular a matrix, (I) of data, each one associated to one or more transactions, structured by hierarchy defined basing on a priority parameter ($MCG_\lambda$), and wherein, for each priority parameter, are associated one or more secondary parameters ($i_{\lambda,\mu}$) identifying said transaction, and/or comprises an analysis and/or processing of data deriving from sources external to the system, and/or comprises an analysis and/or processing of request electronic data that the subject sends to an interactive and/or interpretative dialogue interface of the system.

5. Method according to claim 1, comprising a step of processing of a data group, optionally a matrix, of transactions ($T_{all}$) identifying a global group of previously processed electronic transactions, wherein inside said transaction data group ($T_{all}$) a plurality of transactions, comprising a monetary value, are categorized in a hierarchical structure defined basing on a priority parameter ($\alpha_{m1}$), optionally the subject that has carried out the transaction, and wherein, for each priority parameter, are associated one or more secondary parameters ($\alpha_{in}$, $\alpha_{mn}$) identifying the transaction, the step of processing comprising an extraction, from said transaction data group (Tall), of said plurality of data of transactions (T) carried out by the subject.

6. Method according to claim 1, wherein the proposition of an electronic payment request comprises the activation of an electronic payment module configured for allowing the execution of an electronic payment for the purchase of said product and/or service, optionally instead of the subject, wherein said electronic payment is generated by said proposition of a personalized electronic payment request, and wherein the activation of the electronic payment module causes an electronic access to, and/or an exchange of electronic data with, an electronic payment entity, optionally a bank institute and/or a bank card, optionally credit cards, management institute and/or a financial institute to which the subject has been previously electronically affiliated, and wherein the proposition of the electronic payment request, and/or the electronic payment, concerns a product and/or service proposed through said electronic proposition.

7. Method according to claim 6, wherein the activation of the electronic payment module causes the activation of a products and/or services distribution module, and wherein the activation of the electronic payment module causes an electronic arrangement of an invoicing of amounts corresponding to the electronic payment, and/or causes a control of a distribution and/or a control of a delivery of products and/or services purchased by the subject, and/or causes the start of a step of digital type product and/or service transmission management towards a predefined electronic device, optionally wherein said predefined electronic device is the electronic device of the subject and/or is an electronic device operatively associated to the subject, and/or causes the start of a step of distribution addresses management towards which distributing a product and/or service purchased through said electronic payment, and/or causes the electronic alerting of a distributing partner for the distribution of a physical product towards a predetermined address, said physical product having been purchased through the electronic payment.

8. Method according to claim 1, comprising a step of electronic modelling of a behaviour of the subject, by means of the data processing engine, finalized to define an electronic model of behaviour for said subject, said electronic model being optionally electronically adaptive, said electronic model being based on at least part of the data retrieved in the step of retrieval and/or basing on one or more actions of electronic confirmation of the electronic proposition of personalized purchase services for the subject and/or of the proposition of an electronic payment request, said electronic confirmation being executed by the subject through its own electronic device;

and wherein said step of electronic modelling of the behaviour of the subject comprises a step of application of at least an evolutive computing algorithm (e), optionally comprising at least one among an agent-based type modelling algorithm, an evolutive-type modelling algorithm, and a particle swarm type optimizing algorithm, on at least one among, and preferably on the whole plurality of:
- said group, in particular said matrix, (I) of data, associated each one to one or more transactions,
- an amount threshold data group, in particular an amount threshold data matrix(S), optionally associated to at least one between a data of maximum number of repetitions of propositions by time range and a data related to said time range,
- at least a part ($O_a$) of said at least a group, optionally at least a part of said at least one between a matrix or vector, of feedback data ($O_f$, E),
- in particular wherein the method comprises a step of electronic selection, in particular a step of automated electronic selection, of a subgroup ($O_a$) of said feedback data group ($O_f$, E), said subgroup ($O_a$) of said feedback data group ($O_f$, E) comprising at least a purchase proposal previously electronically proposed and/or provided to said subject and electronically accepted by said subject, optionally having caused said personalized electronic payment,
- the part ($O_a$) of said at least a feedback data group ($O_f$, E) comprising said subgroup ($O_a$) of said feedback data group ($O_f$, E),
- the application of said evolutive computing algorithm (e) bringing to the creation of a data group, optionally a matrix or vector (E), of intermediate result.

9. Method according to claim 3, wherein said subgroup ($O_a$) of said feedback data group ($O_f$, E) and/or the part ($O_a$) of said at least a feedback data group ($O_f$, E) is respectively an enriched subgroup and/or a part and comprising parameters related to a transaction already carried out by said subject, said parameters being extracted from the result data group, optionally from the matrix or vector, (R) of the application of the reinforcement learning algorithm (r) on the feedback data group ($O_f$, E) and/or being extracted from said data group, optionally from said matrix or vector (E) of intermediate result, and/or being extracted from said matrix or vector (H) of proposals of services personalized for the subject.

10. Method according to claim 4, comprising:
- a step of electronic definition of a plurality of segments, of behaviour of subjects, wherein said segments define and/or categorize levels of electronic payment and/or type of products or services purchased through electronic payment, and wherein the application of said clustering algorithm follows said step of electronic definition of the plurality of segments.

11. Method according to claim 3, wherein the electronic filtering through the at least a collaborative filtering algorithm (h) determines the execution of:
- a step of electronic definition of a plurality of patterns associated to products and/or services purchased through electronic payment, said patterns defining geographical locations associated to products and/or services purchased through said electronic payment,
- a step of assignment of at least a pattern of said plurality of patterns to the electronic model of behaviour of said subject and/or a step of logical association between the electronic model of behaviour of said subject with a specific pattern of the plurality of patterns.

12. Method according to claim 4, wherein said electronic filtering through at least a collaborative filtering algorithm (h) is applied to the result data group (R), on the group, optionally on the matrix or vector, ($P_T$) of filtered transaction data, and on a subgroup of said group, optionally said matrix, of clustered electronic data ($P_u$), wherein said subgroup comprises a data cluster ($p_u$) identifying a predetermined class of subjects to which said subject is electronically paired with a criterion of maximum likelihood,
- in particular wherein said group of clustered electronic data ($P_u$) comprises a plurality of clusters ($pu_{11}$-$pu_{\alpha 1}$, ..., $pu_{1\beta}$-$pu_{11\alpha\beta}$) identifying respective classes of the subject, wherein, optionally, each class contains personal data of the subject and/or data related to a merchant category used on average and/or a merchant category code (MCC) used on average for electronic purchases and/or place and/or time data to which the electronic purchases are referred.

13. Method according to claim 1, comprising a step of at least partially automated electronic payment, optionally occurring after the step of data processing and/or after the proposition of a personalized electronic payment request of a predetermined amount,
- wherein, in the step of electronic payment the system electronically accesses to, and/or exchanges electronic data with, an entity of electronic payment, optionally a bank institute and/or a bank card management institute and/or a financing institute, wherein the entity manages at least a payment card, optionally a credit card, and/or a debit card and/or a prepaid card, and/or a bank account and/or an e-wallet and/or a cryptocurrency circuit and/or a service of digital payment and of money transfer through Internet, of the subject,
- and wherein the step of electronic payment comprises the electronic selection, optionally automated, of a payment card, optionally a credit card, and/or a debit card and/or a prepaid card, and/or a bank account and/or an e-wallet and/or a cryptocurrency circuit and/or a service of digital payment and of money transfer through Internet associated to, and previously authorized by, said subject.

14. Method according to claim 13, comprising a step of stochastic definition of said proposal actions, wherein a module of stochastic definition defines and/or determines and/or stores one or more time instants in correspondence of which carrying out said proposal actions and/or, comprises a step of stochastic definition of at least an electronic payment, wherein a module of stochastic definition defines and/or determines and/or stores one or more time instants in correspondence of which carrying out the step of electronic payment.

15. System for providing purchase proposals and personalized and automated payment services to a subject, wherein the system comprises an electronic interface configured for allowing an electronic device operatively associated to a subject to carry out an electronic access to the system;
and wherein said system is configured for:
- retrieving, after the electronic access of the electronic device, at least a first type of electronic data of said subject comprising payment data and/or deadlines and a data group (u) identifying one or more characteristics of the subject, through an electronic reception of at least part of said first type of electronic data from said electronic device or from a third system, and storing in an electronic memory of said system at least part of said first type of electronic data;

wherein said system comprises a data processing engine configured for carrying out a data electronic processing carried out on at least part of the first type of electronic data stored in said electronic memory and carried out after the retrieval of the at least a first type of electronic data, said data electronic processing determining an electronic profiling of the subject, for carrying out a generation, at least partially automated, of a matrix or vector (H) of propositions of services personalized for the subject and/or of propositions of personalized electronic payment requests and for carrying out at least one of the following proposal actions:

an electronic proposition of said services personalized for the subject, for the purchase of at least a product and/or service, said electronic proposition occurring through an electronic transmission towards the electronic device operatively associated to the subject;

a proposition of said personalized electronic payment request of a predetermined amount associated to the purchase of a product and/or service, wherein the amount is determined basing on said first type of electronic data and/or basing on the processing carried out by the data processing engine;

said proposal actions and said matrix or vector (H) of propositions of services personalized for the subject and/or of propositions of personalized electronic payment requests being based at least on at least part of said first type of electronic data stored in the system and/or on at least a preceding proposal action previously electronically processed through said data processing engine in particular on at least a group, optionally on at least one between a matrix or vector, of feedback data ($O_f$, E), comprising feedback data provided by the subject in relation to said preceding proposal action, said matrix or vector (H) of propositions comprising:
at least a proposition of services personalized for the subject and/or at least a proposition of a personalized electronic payment request, and
at least a characteristic associated to said proposition of services personalized for the subject and/or to said proposition of a personalized electronic payment request.

16. System according to claim 15, wherein the data processing engine is configured for:
receiving said feedback data provided by the subject in relation to said preceding proposal action,
generating or updating, said group, optionally said at least one between a matrix or vector, of feedback data ($O_f$, E), after the reception of, and according thereto, said feedback data provided by the subject,
updating said matrix or vector (H) of propositions using the data of said group, optionally said at least one between a matrix or vector, of feedback data ($O_f$, E).

17. System according to claim 15, said data processing engine comprises at least a profiling module configured for carrying out an electronic modelling of a subject finalized to define an electronic model of behaviour for said subject, and is configured for generating the matrix or vector (H) of propositions and/or updating the matrix or vector (H) of propositions carrying out an electronic processing of said feedback data group ($O_f$, E) comprising:
the application of at least an artificial intelligence algorithm, in particular a reinforcement learning algorithm (r), the system being configured for carrying out an at least temporary storage of a group, optionally a matrix or vector, (R) of data result of the application of the artificial intelligence algorithm on the feedback data group ($O_f$, E),
optionally, an electronic filtering through at least a collaborative filtering algorithm (h) applied on the result data group (R) and at least on a filtered transaction data group, optionally a matrix or vector, ($P_T$), comprising a plurality of data of transactions (T) carried out by the subject, wherein, in the filtered transaction data group ($P_T$), the data of transactions (T) carried out by the subject are electronically filtered by means of at least an analysis function of time series, optionally an analysis function of multivariate time series (f: $T \mapsto P_T$),
said group ($P_T$) of filtered transaction data comprising at least a transaction pattern and at least a characteristic associated to said at least a transaction pattern,
optionally wherein said collaborative filtering algorithm (h) comprises at least one among the algorithms of the following list: nearest neighbors, matrix factorization, deep learning,
preferably wherein said data processing engine, optionally said profiling module, is configured for generating the matrix or vector (H) of proposals and/or updating the matrix or vector (H) of proposals carrying out an electronic processing of at least part of the feedback data ($O_f$, E) comprising an application of:
a reinforcement learning algorithm (r) on said at least part of feedback data ($O_f$, E), the application of the reinforcement learning algorithm (r) producing an at least temporary storage of a group, optionally a matrix or vector, (R) of result data of the application of the reinforcement learning algorithm (r) on the feedback data group ($O_f$, E), and, in sequence
a collaborative filtering algorithm (h) applied on the result data group (R) and at least on a filtered transaction data group, optionally a matrix or vector, ($P_T$), comprising a plurality of data of transactions (T) carried out by the subject, wherein, in the filtered transaction data group ($P_T$), the data of transactions (T) carried out by the subject are electronically filtered by means of at least an analysis function of time series, optionally an analysis function of multivariate time series (f: $T \mapsto P_T$).

18. System according to claim 15, wherein the data processing engine is configured for carrying out, in the step of data electronic processing:
an analysis and/or processing of the typology and/or of the segmentation of electronic payments carried out by the subject through the system,
wherein the typology and/or the segmentation of electronic payments is electronically determined by applying at least a clustering algorithm (g: $U_{all} \mapsto P_u$), preferably at least one between a K-means algorithm and a DBSCAN algorithm, on a group, optionally a matrix, of clustered electronic data ($P_u$), comprising said data group (u) identifying one or more characteristics of the subject and other groups of data identifying one or more characteristics of subjects different from said subject, and/or
an analysis and/or processing of data of specific preference of the subject, optionally directly received by the subject and/or electronically extrapolated from previous electronic payments carried out by the subject through the system, wherein said analysis and/or processing of data of specific preference of the subject comprises the processing of a group, in particular a matrix, (I) of data, each one associated to one or more transactions, structured by hierarchy defined basing on a priority parameter ($MCG_\lambda$), and wherein, for each priority parameter, are associated to one or more secondary parameters ($i_{\lambda,\mu}$) identifying said transaction, and/or an analysis and/or processing of data deriving from sources external to the system, and/or an analysis and/or processing of request electronic data that the subject sends to an interactive and/or interpretative dialogue interface of the system.

19. System according to claim 15, wherein the data processing engine is configured for carrying out a processing of a data group, optionally a matrix, of transactions ($T_{all}$) identifying a global group of previously processed electronic transactions, wherein inside said transaction data group ($T_{all}$) a plurality of transactions, comprising a monetary value, are categorized in a hierarchical structure defined basing on a priority parameter ($\alpha_{m1}$), optionally the subject that has carried out the transaction, and wherein, for each priority parameter, are associated one or more secondary parameters ($\alpha_{in}$, $\alpha_{mn}$) identifying the transaction, and wherein the processing comprises an extraction, from said transaction data group ($T_{all}$), of said plurality of data of transactions (T) carried out by the subject.

20. System according to claim 15, comprising at least an electronic payment module configured for allowing the execution of an electronic payment for the purchase of said product and/or service, optionally instead of the subject, wherein said electronic payment is generated by said proposition of a personalized electronic payment request, and wherein the electronic payment module is configured for being activated at least through the proposition of an electronic payment request, wherein the electronic payment module is operatively connected to, and/or is configured for exchanging electronic data with, an electronic payment entity, optionally a bank institute and/or a bank card, optionally credit card, management institute, and/or a financial institute to which the subject has been previously electronically affiliated, and wherein the proposition of the electronic payment request, and/or the electronic payment, concerns a product and/or service proposed through said electronic proposition.

21. System according to claim 15, wherein the data processing engine comprises at least a profiling module configured for carrying out an electronic modelling of a subject finalized to define an electronic model of behaviour for said subject, and wherein said profiling module is configured for applying at least an evolutive computing algorithm (e), optionally comprising at least one among an agent-based type modelling algorithm, an evolutive-type modelling algorithm, and a particle swarm type optimizing algorithm, on at least one among, and preferably on the whole plurality of:

said group, in particular said matrix, (I) of data, associated each one to one or more transactions, an amount threshold data group, in particular a matrix of amount threshold data(S), optionally associated to at least one between a data of maximum number of repetitions of propositions by time range and a data related to said time range, at least a part ($O_a$) of said at least a group, optionally at least a part of said at least one between a matrix or vector, of feedback data ($O_f$, E), in particular wherein the system, preferably the profiling module, is configured for selecting, optionally automatically, a subgroup ($O_a$) of said feedback data group ($O_f$, E), said subgroup ($O_a$) of said feedback data group ($O_f$, E) comprising at least a purchase proposal proposed and/or provided to said subject and electronically accepted by said subject, optionally having caused said personalized electronic payment, the part ($O_a$) of said at least a feedback data group ($O_f$, E) comprising said subgroup ($O_a$) of said feedback data group ($O_f$, E), the application of said evolutive computing algorithm (e) bringing to the creation of an intermediate result data group, optionally a matrix or vector (E).

22. System according to claim 17, wherein said subgroup ($O_a$) of said feedback data group ($O_f$, E) and/or the part ($O_a$) of said at least a feedback data group ($O_f$, E) is respectively an enriched subgroup and/or a part and comprising parameters related to a transaction already carried out by said subject, said parameters being extracted from the group, optionally from the matrix or vector, (R) of data result of the application of the reinforcement learning algorithm (r) on the feedback data group ($O_f$, E) and/or being extracted from said data group, optionally from said intermediate result matrix or vector (E), and/or being extracted from said matrix or vector (H) of proposals of services personalized for the subject.

23. System according to claim 18, wherein the profiling module comprises an identification module of patterns and/or segments, configured at least for electronically defining a plurality of segments of behaviour of subjects, wherein said segments define and/or categorize levels of electronic payment and/or type of products or services purchased through electronic payment, and for assigning at least a segment of said plurality of segments to the electronic model of behaviour of the subject and/or for logically associating the electronic model of behaviour of said subject with a specific segment of the plurality of segments, and wherein the application of said clustering algorithm follows said electronic definition of the plurality of segments.

24. System according to claim 17, wherein in the profiling module the identification module of patterns and/or segments, is configured at least for:

electronically defining a plurality of patterns associated to products and/or services purchased through electronic payment, said patterns defining geographical locations associated to products and/or services purchased through said electronic payment, and for assigning at least a pattern of said plurality of patterns to the electronic model of behaviour of said subject and/or for logically associating the electronic model of behaviour of said subject with a specific pattern of the plurality of patterns, through said at least a collaborative filtering algorithm (h).

25. System according to claim 18, wherein said electronic filtering through at least a collaborative filtering algorithm (h) is applied on the result data group (R), on the group, optionally on the matrix or vector, ($P_T$) of filtered transaction data, and on a subgroup of said group, optionally said matrix, of clustered electronic data ($P_u$), wherein said subgroup comprises a data cluster ($P_T$) identifying a predetermined class of subjects to which said subject is electronically paired with a criterion of maximum likelihood, in particular wherein said group of clustered electronic data ($P_u$) comprises a plurality of clusters ($pu_{11}$-$pu_{\alpha 1}$, . . . , $pu_{1\beta}$-$pu_{\alpha\beta}$) identifying respective classes of the subject, wherein, optionally, each class contains personal data of the subject and/or data related to a merchant category used on average and/or a merchant category code (MCC) used on average for electronic purchases and/or place and/or time data to which the electronic purchases are referred.

26. System according to claim 15, wherein the electronic payment module is configured for carrying out, and/or for allowing the execution of, an electronic payment of said product and/or service in an at least partially automated way,
   said electronic payment module being configured for electronically accessing, and/or exchanging electronic data with, an electronic payment entity, optionally a bank institute and/or a bank card management institute and/or a financing institute, wherein the entity manages at least a payment card, optionally a credit card, and/or a debit card and/or a prepaid card, and/or a bank account and/or an e-wallet and/or a cryptocurrency circuit and/or a service of digital payment and of money transfer through Internet, of the subject, and
   wherein said electronic payment module is configured for causing the execution of an electronic payment through an electronic selection, optionally automated, of a payment card, optionally a credit card, and/or a debit card and/or a prepaid card, and/or a bank account and/or an e-wallet and/or a cryptocurrency circuit and/or a service of digital payment and of money transfer through Internet associated to, and previously authorized by, said subject.

27. System according to claim 15, wherein the data processing engine comprises a stochastic definition module configured for causing the stochastic definition of said proposal actions, said stochastic definition module defining and/or determining and/or storing one or more time instants in correspondence of which executing said proposal actions and/or being configured for defining and/or determining and/or storing one or more time instants in correspondence of which executing the electronic payment.

28. A system for providing purchase proposals and personalized and automated payment services to a subject, wherein the system comprises an electronic interface configured for allowing an electronic device operatively associated to a subject to carry out an electronic access to the system;
   and wherein said system is configured for:
      retrieving, after the electronic access of the electronic device, at least a first type of electronic data of said subject comprising payment data and/or deadlines and a data group (u) identifying one or more characteristics of the subject, through an electronic reception of at least part of said first type of electronic data from said electronic device or from a third system, and
      storing in an electronic memory of said system at least part of said first type of electronic data;
      wherein said system comprises a data processing engine configured for carrying out a data electronic processing carried out on at least part of the first type of electronic data stored in said electronic memory and carried out after the retrieval of the at least a first type of electronic data, said data electronic processing determining an electronic profiling of the subject, for carrying out a generation, at least partially automated, of a matrix or vector (H) of propositions of services personalized for the subject and/or of propositions of personalized electronic payment requests and for carrying out at least one of the following proposal actions:
         an electronic proposition of said services personalized for the subject, for the purchase of at least a product and/or service, said electronic proposition occurring through an electronic transmission towards the electronic device operatively associated to the subject;
         a proposition of said personalized electronic payment request of a predetermined amount associated to the purchase of a product and/or service, wherein the amount is determined basing on said first type of electronic data and/or basing on the processing carried out by the data processing engine;
      said proposal actions and said matrix or vector (H) of propositions of services personalized for the subject and/or of propositions of personalized electronic payment requests being based at least on at least part of said first type of electronic data stored in the system and/or on at least a preceding proposal action previously electronically processed through said data processing engine in particular on at least a group, optionally on at least one between a matrix or vector, of feedback data ($O_f$, E), comprising feedback data provided by the subject in relation to said preceding proposal action,
      said matrix or vector (H) of propositions comprising:
         at least a proposition of services personalized for the subject and/or at least a proposition of a personalized electronic payment request, and
         at least a characteristic associated to said proposition of services personalized for the subject and/or to said proposition of a personalized electronic payment request;
      said system comprising at least an electronic payment module configured for performing an electronic payment for the purchase of said product and/or service, optionally instead of the subject, wherein said electronic payment is generated by said proposition of a personalized electronic payment request, and wherein the electronic payment module is configured for being activated at least through the proposition of an electronic payment request,
         wherein the electronic payment module is configured for carrying out an electronic payment of said product and/or service in an at least partially automated way,
         said electronic payment module being configured for electronically accessing, and transceiving electronic data with, an electronic payment entity, optionally a bank institute and/or a bank card management institute and/or a financing institute, wherein the entity manages at least a payment card, optionally a credit card, and/or a debit card and/or a prepaid card, and/or a bank account and/or an e-wallet and/or a cryptocurrency circuit and/or a service of digital payment and of money transfer through Internet, of the subject, and
         wherein said electronic payment module is configured for causing the execution of said electronic payment through an electronic selection of a payment card, optionally a credit card, and/or a debit card and/or a prepaid card, and/or a bank account and/or an e-wallet and/or a cryptocurrency circuit and/or a service of digital payment and of money transfer through Internet electronically associated to, and previously electronically authorized by, said subject.

* * * * *